(12) United States Patent
Toyoda

(10) Patent No.: US 6,835,009 B2
(45) Date of Patent: Dec. 28, 2004

(54) SHUTTER APPARATUS

(75) Inventor: Yasuhiro Toyoda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/055,978

(22) Filed: Jan. 28, 2002

(65) Prior Publication Data
US 2002/0110377 A1 Aug. 15, 2002

(30) Foreign Application Priority Data
Jan. 31, 2001 (JP) ........................................ 2001/023353

(51) Int. Cl.⁷ .............................................. G03B 9/40
(52) U.S. Cl. ...................... 396/484; 396/488; 396/489
(58) Field of Search ................................. 396/483, 484, 396/487, 488, 489

(56) References Cited

U.S. PATENT DOCUMENTS

| | | | | |
|---|---|---|---|---|
| 4,529,285 A | * | 7/1985 | Uematsu | 396/452 |
| 4,737,808 A | | 4/1988 | Toyoda | 354/246 |
| 5,875,368 A | * | 2/1999 | Hasuda et al. | 396/484 |
| 6,064,827 A | | 5/2000 | Toyoda | 396/55 |
| 6,106,165 A | * | 8/2000 | Tanabe | 396/471 |
| 6,288,854 B1 | | 9/2001 | Toyoda | 359/830 |
| 6,474,880 B2 | * | 11/2002 | Toyoda et al. | 396/486 |
| 6,530,703 B2 | * | 3/2003 | Nakano et al. | 396/456 |
| 6,550,987 B2 | * | 4/2003 | Ogawa | 396/488 |

FOREIGN PATENT DOCUMENTS

| | | |
|---|---|---|
| JP | 35-29651 | 12/1932 |
| JP | 57-57367 | 4/1982 |
| JP | 6-26896 | 4/1994 |
| JP | 7-25787 | 5/1995 |

* cited by examiner

Primary Examiner—Russell Adams
Assistant Examiner—Michael Dalakis
(74) Attorney, Agent, or Firm—Fitzpatrick, Cella, Harper & Scinto

(57) ABSTRACT

Disclosed are shutter apparatus provided with a shutter base plate having a shutter aperture, a first arm member which rotates around a center of rotation at a first axis, relative to the shutter base plate, a second arm member which rotates around a center of rotation at a second axis, relative to the shutter base plate, and a plurality of shutter blades, wherein each of the plurality of shutter blades is coupled to the first and second arm members, wherein the first and second arm members rotate around their respective axes whereby the plurality of shutter blades run over the shutter aperture, wherein each shutter blade has a blade main body portion extending in a direction perpendicular to a running direction thereof, and wherein a first shutter blade with a smallest running travel comprises a light shielding portion projecting in the running direction on the coupling portion side to the first and second arm members and arranged to effect light shielding of the shutter aperture, and also disclosed are shutter apparatus permitting fast shutter speeds while being constructed in compact structure.

10 Claims, 20 Drawing Sheets

SHUTTER APPARATUS

BACKGROUND OF THE INVENTION

1. Field of the Invention

The present invention relates to shutter apparatus being suitably applicable to single-lens reflex cameras and of a so-called split blade type.

2. Related Background Art

Conventionally, the single-lens reflex cameras and others are often constructed using a focal plane shutter of a type in which groups of split light shielding blades are rotatably supported by parallel link mechanisms using two arm members.

The general mechanisms used in the focal plane shutters of this type are classified into a long arm type and a short arm type, depending upon the difference in a method of holding the light shielding blade groups by the arm members.

Described herein are so-called, vertically running focal plane shutters constructed to run the light shielding blade groups vertically.

First, the focal plane shutters of the long arm type are constructed in such structure that the light shielding blade groups are rotatably held on the arm members on the opposite side of the shutter aperture to the rotatable base ends of the arm members, as disclosed in Japanese Utility Model Publication No. 35-29651. For this reason, the arms become longer than the width of the shutter aperture.

Since this long arm type requires only small angles of rotation of the arm members for opening and closing of the shutter aperture by the light shielding blade groups, amounts of displacement become small in the direction perpendicular to the running direction of the light shielding blade groups during the opening and closing operation, which is advantageous to lateral downsizing of the shutter apparatus.

However, where the number of light shielding blades in each group that can be held by the two arm members was not less than 3, the long arm type had the drawback that the structure became complicated and the drawback that the inertia of the blade units became so large because of the long arms as to be disadvantageous to fast running. For this reason, the focal plane shutters of the long arm type unsuitable for increase of speed are not being used with increase in exposure time of the shutter and with increase in flash light synchronization time in recent years.

Thus the short arm type was devised in order to overcome the drawbacks of the long arm type and was substantiated in such structure that the two arm members rotatably held each group of many light shielding blades near the same side with respect to the shutter aperture as the side near the base ends of the arm members, without interposing the shutter aperture in between, though it was disadvantageous to the lateral downsizing of the shutter apparatus. In addition, in order to make the inertia smaller, it is desirable to minimize the lengths of the arms.

As an example of this short arm type, the structure and dimensional relation thereof are presented in FIGS. 21 and 22 (wherein FIG. 21 shows a running ready state and FIG. 22 a running end state).

In this shutter apparatus (which will be referred to hereinafter as the first conventional example), a leading-curtain blade unit and a trailing-curtain blade unit are mounted on a base plate 101 (shutter ground board) having a shutter aperture 101a.

The leading-curtain blade unit is composed of five blades. Each of first arm 106 and second arm 107 on the leading curtain side has a base end rotatably supported at a shaft 101d, 101e.

A slit forming blade 102 and covering blades 103, 104, 105, 105' are rotatably coupled to the first arm 106 and the second arm 107 by blade caulking dowels 108a, 108b, 108c, 108d, 108e, 109a, 109b, 109c, 109d, 109e, and a parallel link is comprised of these two arms 106, 107, five blades, and base plate.

The trailing-curtain blade unit is composed of four blades. Each of first arm 114 and second arm 115 on the trailing curtain side has a base end rotatably supported at a shaft 101f, 101g.

A slit forming blade 110 and covering blades 111, 112, 113 are rotatably coupled to the first arm 114 and the second arm 115 by blade caulking dowels 116a, 116b, 116c, 116d, 117a, 117b, 117c, 117d, and a parallel link is comprised of these two arms 114, 115, four blades, and base plate.

In each of the leading curtain and the trailing curtain, the blade caulking dowels are successively arranged so as to draw a gentle arc and the first arm and the second arm are juxtaposed near to each other in a superimposed state in which the blade unit opens the shutter aperture.

In each of the leading curtain and the trailing curtain, neither of the blade 105', 113 with the smallest travel (moving distance) and the blade 105, 112 with the second smallest travel (moving distance) is provided with a light shielding piece extending generally in the blade running direction, near the coupling portion to each arm.

For this reason, each of the blades 104, 111 with the third smallest travel, and the blade 103 with the fourth smallest travel in the leading curtain is provided with a light shielding piece (103a, 104a, 111a indicated by hatching in the drawings).

Further, in the superimposed state in which the blade group of the leading curtain or the trailing curtain opened the shutter aperture 101a, the light shielding piece of the blade 104, 111 with the third smallest travel (104a, 111a indicated by hatching) was not located between the coupling portions 109d, 109e; 117c, 117d to the second arm, of the blade 105', 113 with the smallest travel and the blade 105, 112 with the second smallest travel.

From the viewpoint that it was hard to achieve the downsizing by the parallel link mechanisms using two arms, the following was proposed as a shutter apparatus downsized by adding the third auxiliary arm.

The shutter apparatus disclosed in Japanese Utility Model Publication No. 6-26896 (which will be referred to hereinafter as the second conventional example) was constructed in such structure that in the blade superimposed state the coupling portions on the first and second arms for coupling and supporting the slit forming blade were accommodated in a storage region present between the finder and the aperture window and that the third arm supporting the other covering blades was located outside the region, thereby decreasing the lateral contour size of the shutter apparatus.

This apparatus is constructed in the structure in which each arm is made slim in order to place the three arms in the narrow space and, in the superimposed state in which the blade group opens the shutter aperture, the first arm and the third arm are arranged so that the center of rotation of the base end of the third arm is interposed between the center of rotation of the base end of the first arm and the caulking dowel of the third covering blade and so that the caulking dowel of the third covering blade on the first arm is interposed between the center of rotation of the base end of the third arm and the caulking dowel of the third covering blade.

Although not referred to in this official gazette, the light shielding piece projecting on the almost opposite side to the blade running direction is provided near the coupling portions to the first and second arms in the blade with the second smallest travel, as shown in the drawings of the official gazette.

However, the light shielding piece provided in the blade with the third smallest travel is not located between the coupling portions to the second arm of the blade with the smallest travel and the blade with the second smallest travel in the superimposed state in which the blade group opens the shutter aperture.

Further, Japanese Utility Model Publication No. 7-25787 discloses the shutter apparatus also having the third arm (which will be referred to hereinafter as the third conventional example) wherein, in order to prevent exposure unevenness caused when the parallel state of the slit forming blade is degraded by deflection, swingback, play, etc. of the slit forming blade, the parallel link is composed of the first arm, the second arm, and a plurality of covering blades and the first arm and the third arm support the slit forming blade without constituting a parallel link.

Although not referred to in this official gazette, either, the light shielding pieces projecting on the almost opposite side to the blade running direction are formed near the coupling portions to the first and second arms in the blade with the smallest travel and the blade with the second smallest travel, as shown in the drawing of the embodiment.

However, the light shielding piece provided in the blade with the third smallest travel is not located between the coupling portions to the second arm of the blade with the smallest travel and the blade with the second smallest travel in the superimposed state in which the blade group opens the shutter aperture (this shutter apparatus will be referred to hereinafter as the third conventional example).

As a downsized shutter apparatus in another structure (which will be referred to hereinafter as the fourth conventional example), for example, Japanese Utility Model Publication No. 57-57367 discloses the apparatus having the slit forming blade and covering blades driven by the parallel link mechanism using two arms, wherein for supporting one end of the first covering blade subsequent to the slit forming blade, a blade supporting member is rotatably supported on one arm to increase degrees of freedom for design of the supporting position of the first covering blade, thereby preventing interference between the blade and the supporting position in the downsized structure.

The supporting portion of the first covering blade is interposed between the support point on the arm of the blade supporting member and the support point on the arm of the second covering blade in the superimposed state in which the blade unit opens the shutter aperture.

Although not referred to in this official gazette, the light shielding piece extending on the almost opposite side to the blade running direction is provided near the coupling portion to the first and second arms in the blade with the smallest travel, in the drawings.

However, the blade with the third smallest travel (slit forming blade 3a) is not provided with the light shielding piece extending on the almost opposite side to the blade running direction near the coupling portions to the two arms.

Neither of the second, third, and fourth conventional examples described above is of such structure that the coupling portions to the arms of the blade with the smallest travel and the blade with the second smallest travel in the blade groups are located outside an extension of the width of the blade main body portion in the blades.

In general, for downsizing of the shutter apparatus (particularly, lateral downsizing), the smaller the number of split blades in each blade group, the smaller the number of coupling portions between the arms and the blades and the smaller the area occupied by the coupling portions, which is advantageous to the downsizing.

On the other hand, the smaller the number of blades, the smaller the mutual overlapping amount of the blades for light shielding of the shutter aperture of predetermined size, which will make it hard to ensure the light shielding performance.

In the first conventional example, if the length of the arms is decreased in order to achieve the downsizing, since the number of blades in the leading curtain is as large as five, the intervals of the blade caulking dowels will become smaller while being successively arranged to draw a gentle arc and degrees of freedom will be decreased for the rotatable supporting positions of the covering blades, so as to cause interference in the blade unit (for example, in FIG. 22, interference between the circumference of the base end 106*b* of the first arm 106 and the circumference of the second arm 107 or the covering blade 105' around the blade caulking dowel 109*e*, interference between the circumference of the first arm 106 around the blade caulking dowel 108*e* and the circumference of the second arm 107 or the covering blades 104, 105 around the blade caulking dowels 109*c*, 109*d*, etc.), which will not allow increase in operating angles of rotation of the arms.

The reason for this is that as long as the size of the shutter aperture in the blade running direction is fixed, the decrease in the length of the arms in the parallel link requires increase in the operating angles of rotation of the arms in order to move the blades by the determined distance.

In addition, the first conventional example has the disadvantage that it becomes difficult to maintain the overlapping amount of the slit forming blade and the covering blades during expansion of the blades closing the shutter aperture. Accordingly, the first conventional example failed to downsize the apparatus largely.

On the other hand, let us suppose the trailing-curtain blade unit of the four blade structure is also applied to the leading-curtain blade unit. The overlapping amount of the blades is small, about 2 mm, during expansion of the trailing curtain, as shown in FIG. 22. Even if the width of each blade is increased in the range allowed by the blade storage space in the superimposed state of the leading curtain, the intervals of the blade caulking dowels will also be short while the blade caulking dowels are successively arranged so as to draw a gentle arc, as in the case of the foregoing blade unit of the five blade structure. This will decrease degrees of freedom for the rotatably supporting positions of the covering blades from constrictions on the arrangement of the blade caulking dowels, so as to cause interference in the blade unit (for example, in FIG. 21, interference between the circumference of the base end 114*b* of the first arm 114 and the circumference of the second arm 115 or the covering blade 113 around the blade caulking dowel 117*b*, interference between the circumference of the first arm 114 around the blade caulking dowel 116*d* and the circumference of the second arm 115 or the covering blade 112 around the blade caulking dowel 117*c*, etc.), which allows increase of only about 1 mm more on the opposite side to the blade running direction. Therefore, the conventional technology failed to ensure the desired blade overlapping amount of 4 mm and also failed to downsize the apparatus largely (reference should be made to (6) described hereinafter as to the description concerning the arrangement of the blade caulking dowels).

In both the leading curtain and the trailing curtain, neither of the blade 105', 113 with the smallest travel and the blade 105, 112 with the second smallest travel is provided with the light shielding piece extending in the blade running direction near the coupling portion to the arms. The reason for it is that the distance is large between the coupling portions to the arms of the blade 105', 113 with the smallest travel and the blade 105, 112 with the second smallest travel and the edge 101*a'* on the blade root side in the shutter aperture 101*a* and even with provision of the light shielding piece this light shielding piece does not enter the shutter aperture 101*a* and is thus useless (unnecessary), which means that the downsizing is not implemented by that degree in the direction perpendicular to the blade running direction.

On the other hand, since in the first conventional example the light shielding pieces (103*a,* 104*a,* 111*a* indicated by hatching) are provided in the blades 104, 111 with the third smallest travel, and the blade 103 with the fourth smallest travel in the leading curtain, which have the coupling portions to the arms at the positions near the shutter aperture 101*a,* the mass increases in the blades with the large travels located on the distal end side of the arms.

Accordingly, the center of gravity of each blade unit is shifted to the side where the radius of rotation is large from the base ends of the arms, which posed the problem that the inertia of the blade units was increased.

Further, in the first conventional example, in the superimposed state of the blade group of the leading curtain or the trailing curtain, the light shielding piece (104*a,* 111*a* indicated by hatching) of the blade 104, 111 with the third smallest travel is not located between the coupling portions (109*d* and 109*e;* 117*c* and 117*d*) to the second arm of the blade 105', 113 with the smallest travel and the blade 105, 112 with the second smallest travel, which also indicates that the downsizing is not implemented in the direction perpendicular to the blade running direction by shortening the lengths of the arms and increasing the angles of rotation of the arms.

In the foregoing second conventional example (Japanese Utility Model Publication No. 6-26896), the third arm was added for supporting the covering blade group, which caused the disadvantages that the structure became more complicated, the operational resistance also became higher, and the inertia of the blade units became larger than in the case of the general parallel link mechanisms with two arms as in the first conventional example.

Since the three arms were placed in the small space, each arm became slim, which also caused the disadvantage that the strength of the arms themselves was low.

In addition, since in the superimposed state of the blades the coupling portions on the first and second arms supporting the slit forming blade were accommodated in the storage region present between the finder and the aperture window, the coupling distance became short on the slit forming blade of the parallel link, which also caused the disadvantage that it was difficult to maintain the parallelism of the exposure slit.

Further, since in the second conventional example the coupling portions of the blade 6', 106 (which are reference numerals in No. 6-26896; the same will also apply to the description below in this paragraph) with the second smallest travel to the first and second arms 8', 10'; 108, 110 was placed within the root width of the strap-shaped blade main body portion so as, to make the supporting portions close to each other, the light shielding piece was large, which lowered the function of light shielding of the shutter aperture by the blade 7', 107 with the smallest travel.

For this reason, the mass increases in the blades with the larger, even a little, travels located on the distal end side of the arms with respect to the blade with the smallest travel. Accordingly, the center of gravity of the blade unit was shifted to the side where the radius of rotation was large from the base ends of the arms, which caused the disadvantage that the inertia of the blade units became large.

In the foregoing third conventional example (Japanese Utility Model Publication No. 7-25787), the fundamental structure is the same as in the first embodiment described in the second conventional example, and thus it had the drawbacks of the complicated structure due to the three arms, the increase of operational resistance, and the large inertia of the blade units, the drawback of the low strength of the arms themselves, and the drawback of the large light shielding pieces, because the coupling portions of the blade 2*c* (which is the reference numeral in No. 7-25787; the same will also apply to the description below in this paragraph and in the next paragraph) with the second smallest travel to the first and second arms 11, 12 were placed within the root width of the strap-shaped blade main body portion so as to make the supporting portions close to each other.

In addition, the coupling portions of the blade 2*d* with the smallest travel to the first and second arms 11, 12 were also placed within the root width of the strap-shaped blade main body portion and the light shielding portion with the slim root was provided in the shape completely independent of the blade portion and the coupling portion, which resulted in the drawback that the light shielding piece was easy to break at the root.

In the foregoing fourth conventional example (Japanese Utility Model Publication No. 57-57367), the weight of the blade supporting member and the blade was exerted on the supporting portions on the arms supporting the blade supporting member, and thus there was the disadvantage that the durability was poor, particularly, at the supporting portions.

The addition of the blade supporting member also caused the disadvantages that the structure became more complicated, the operational resistance was also greater, and the inertia of the blade units became larger than in the case of the general parallel link mechanisms with two arms as in the first conventional example.

Accordingly, the above conventional examples were disadvantageous to the fast running of the blade units and it was thus difficult, for example, in cameras to implement the exposure time shorter than $\frac{1}{4000}$ sec or implement the strobe synchronization time shorter than $\frac{1}{200}$ sec.

The shutter charge energy necessary for implementing the same curtain speed increased, which increased the size of the camera and which was disadvantageous to increasing the frame speed during continuous shooting.

SUMMARY OF THE INVENTION

A first object of the present invention is to provide shutter apparatus downsized, particularly, in the size in the direction perpendicular to the running direction of the light shielding blades, maintaining the sufficient blade overlapping amount for light shielding, keeping the inertia of the blade units small by some means for the mounting positions of the light shielding pieces, having high operation efficiency and excellent durability, and being suitable for fast operation.

One aspect of the present invention discloses a shutter apparatus comprising:

a shutter base plate having a shutter aperture;

a first arm member which rotates around a center of rotation at a first axis, relative to the shutter base plate;

a second arm member which rotates around a center of rotation at a second axis, relative to the shutter base plate; and a plurality of shutter blades, wherein each of the plurality of shutter blades is coupled to the first and second arm members, wherein the first and second arm members rotate around their respective axes whereby the plurality of shutter blades run over the shutter aperture, wherein each shutter blade has a blade main body portion extending in a direction perpendicular to a running direction thereof, and wherein a first shutter blade with a smallest running travel comprises a light shielding portion projecting in the running direction on the coupling portion side to the first and second arm members and arranged to effect light shielding of the shutter aperture.

Particularly, the apparatus satisfies the following condition:

$$L1 > W1,$$

where W1 is a length in the running direction, of the blade main body portion of the first shutter blade and L1 is a projection length of the light shielding portion from the blade main body portion.

Further, a second shutter blade with a second smallest running travel out of the plurality of shutter blades comprises a second light shielding portion projecting in the running direction on the coupling portion side to the first and second arm members and arranged to effect light shielding of the shutter aperture.

The apparatus satisfies the following condition:

$$L2 > W2,$$

where W2 is a length in the running direction, of the blade main body portion of the second shutter blade and L2 is a projection length of the second light shielding portion from the blade main body portion.

Another aspect of the invention discloses a shutter apparatus comprising:

a shutter base plate having a shutter aperture;

a first arm member which rotates around a center of rotation at a first axis, relative to the shutter base plate;

a second arm member which rotates around a center of rotation at a second axis, relative to the shutter base plate; and a plurality of shutter blades, wherein each of the plurality of shutter blades is coupled to the first and second arm members, wherein the first and second arm members rotate around their respective axes whereby the plurality of shutter blades run over the shutter aperture, wherein each shutter blade has a blade main body portion extending in a direction perpendicular to a running direction thereof, and wherein a first shutter blade with a second smallest running travel comprises a light shielding portion projecting in the running direction on the coupling portion side to the first and second arm members and arranged to effect light shielding of the shutter aperture.

Particularly, the apparatus satisfies the following condition:

$$L2 > W2,$$

where W2 is a length in the running direction, of the blade main body portion of the first shutter blade and L2 is a projection length of the light shielding portion from the blade main body portion.

Further, a second shutter blade with a smallest running travel out of the plurality of shutter blades comprises a second light shielding portion projecting in the running direction on the coupling portion side to the first and second arm members and arranged to effect light shielding of the shutter aperture.

The apparatus satisfies the following condition:

$$L1 > W1,$$

where W1 is a length in the running direction, of the blade main body portion of the second shutter blade and L1 is a projection length of the second light shielding portion from the blade main body portion.

Further features of the invention will become apparent from the drawings and the description which will follow.

BRIEF DESCRIPTION OF THE DRAWINGS

FIGS. 13A and 13B are views showing the structure of an SLM according to the second embodiment of the present invention, wherein FIG. 13A is a view during writing of an image and FIG. 13B a view during observation of an image;

DESCRIPTION OF THE PREFERRED EMBODIMENTS

Figure 1:
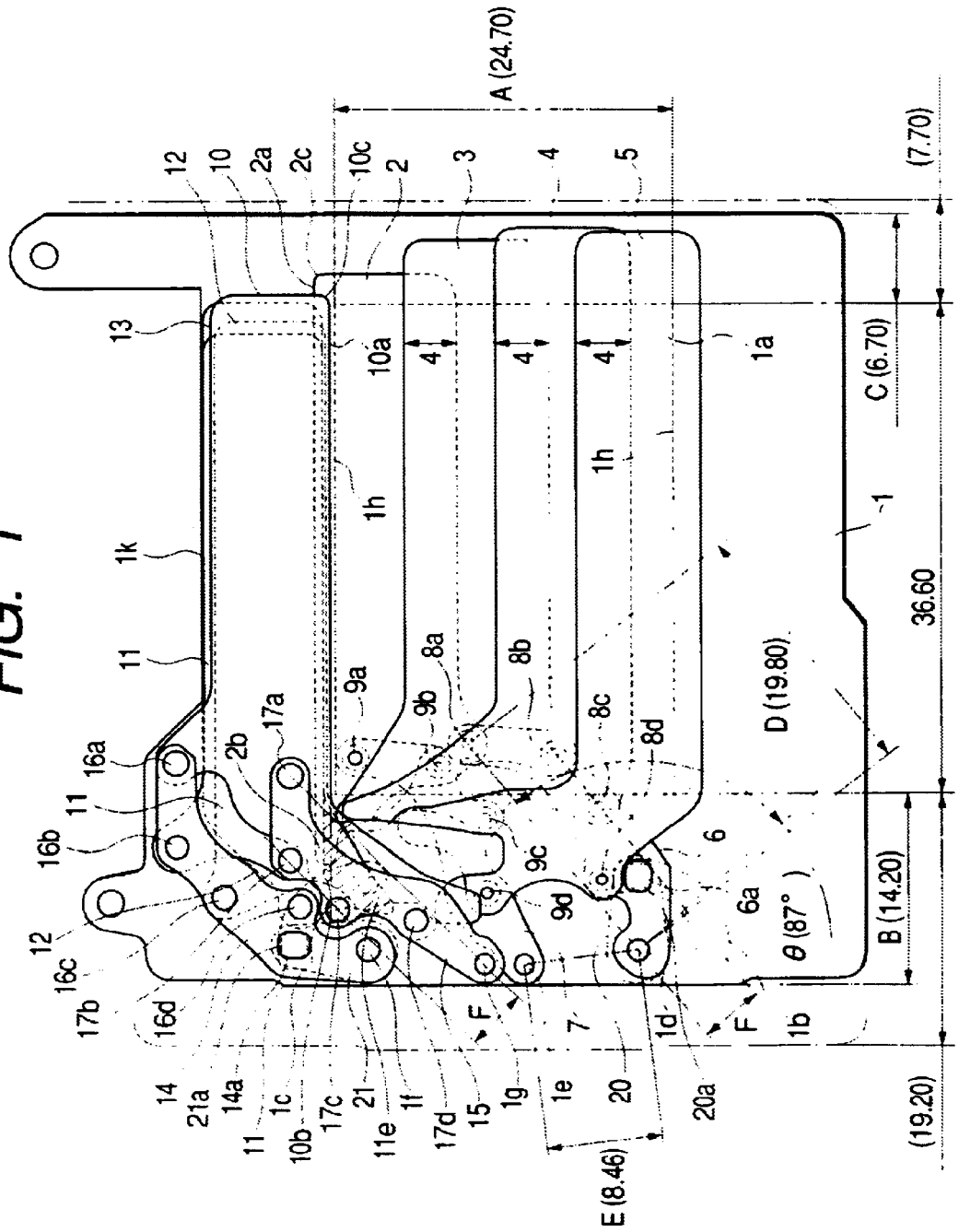
FIG. 1 is a front view of a focal plane shutter according to the first embodiment of the present invention in which the blade groups thereof are in the running ready state.
Figure 2:
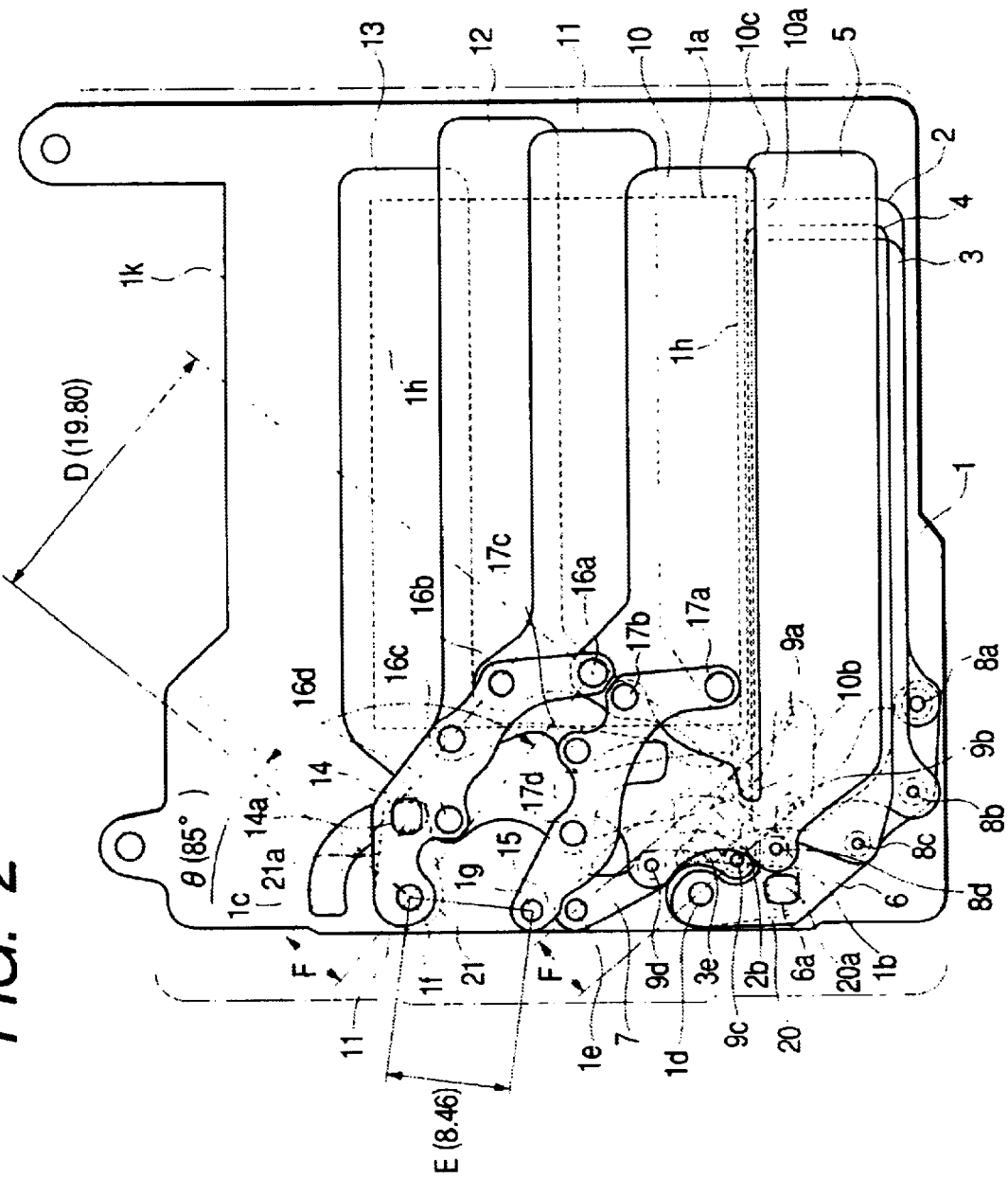
FIG. 2 is a front view of the focal plane shutter according to the first embodiment of the present invention in which the blade groups are in the running end state.
Figure 3:
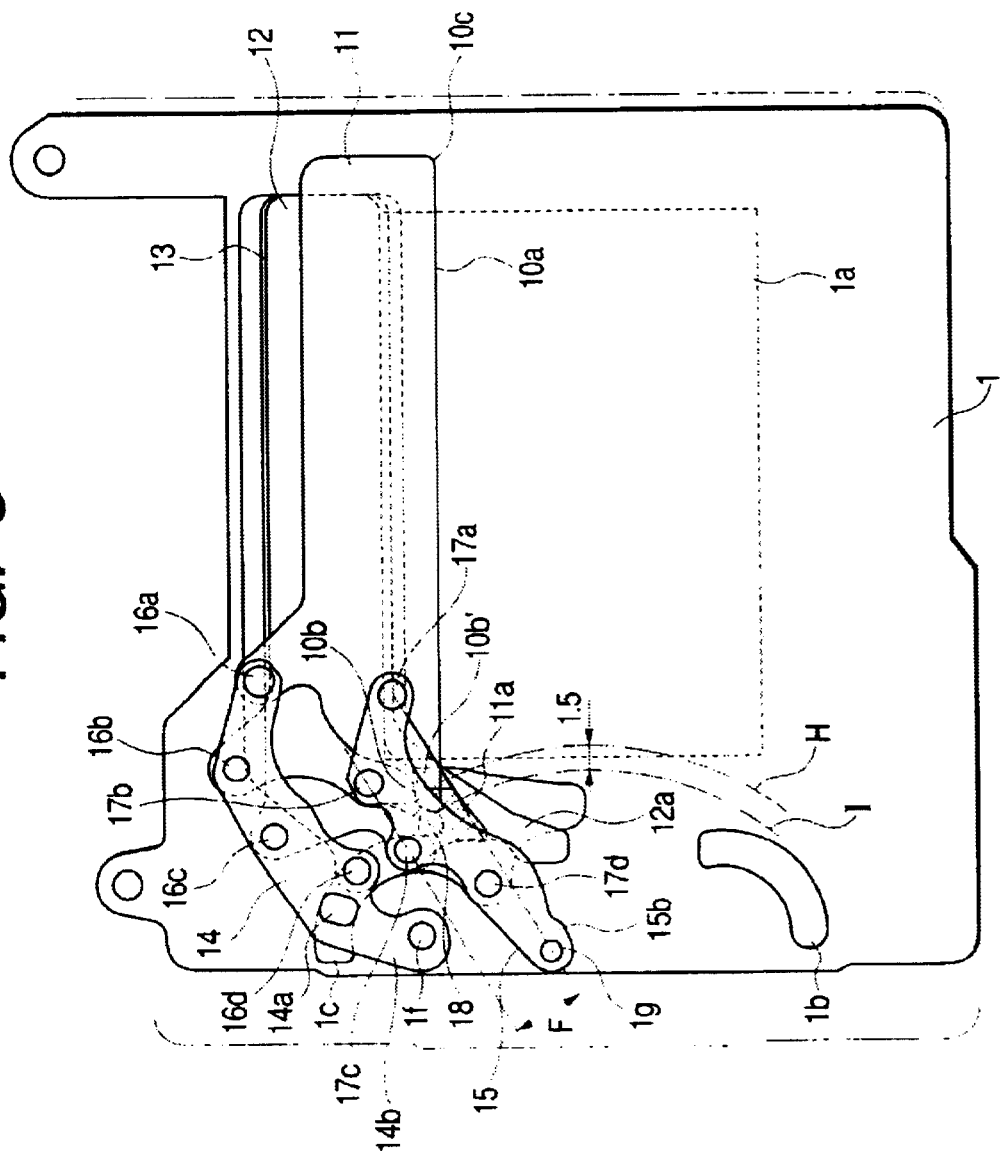
FIG. 3 is a view explaining the effect by a scheme of devising the blade holding position to the arms in the focal plane shutter according to the first embodiment of the present invention.
Figure 4:
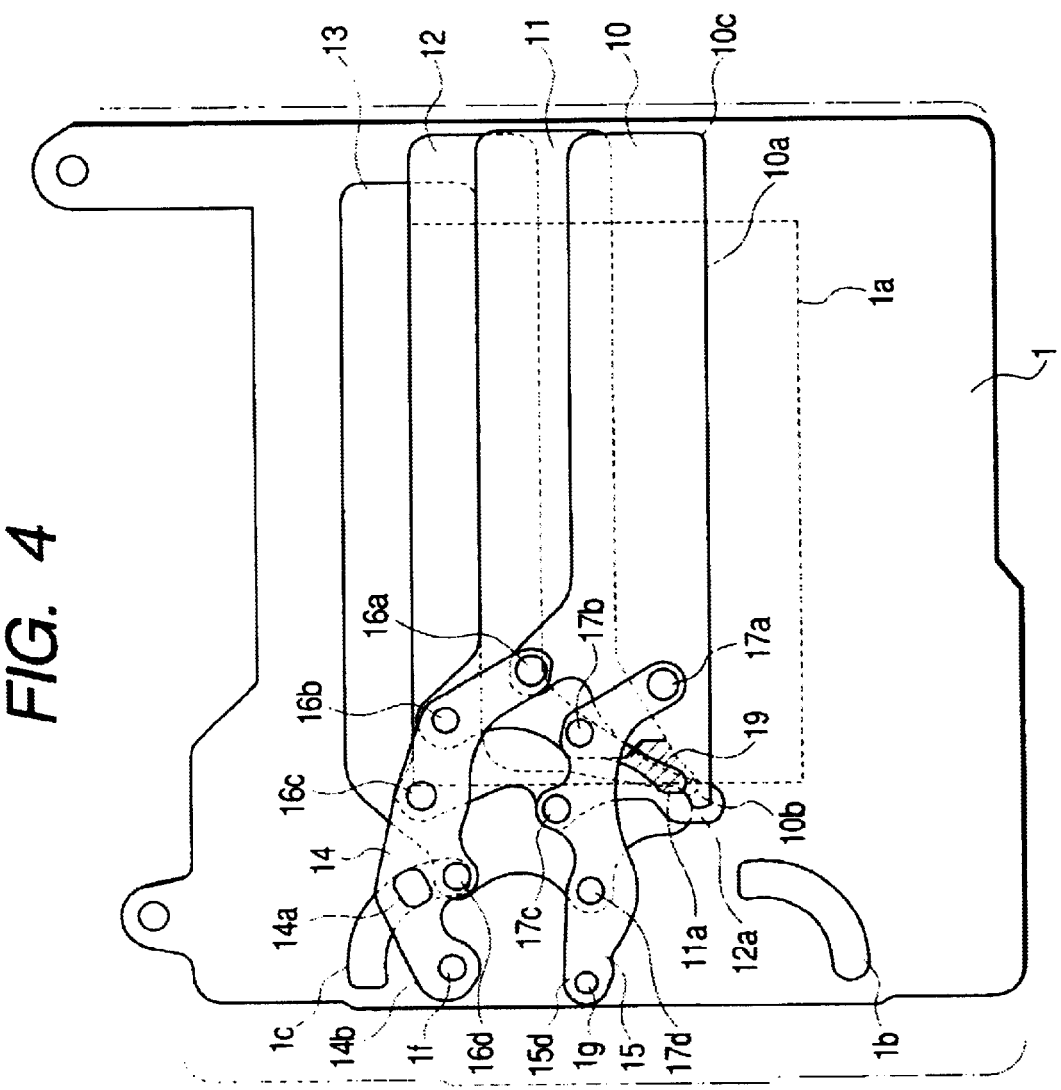
FIG. 4 is a view explaining the effect by a scheme of devising the blade holding position to the arms in the focal plane shutter according to the first embodiment of the present invention.
Figure 5:
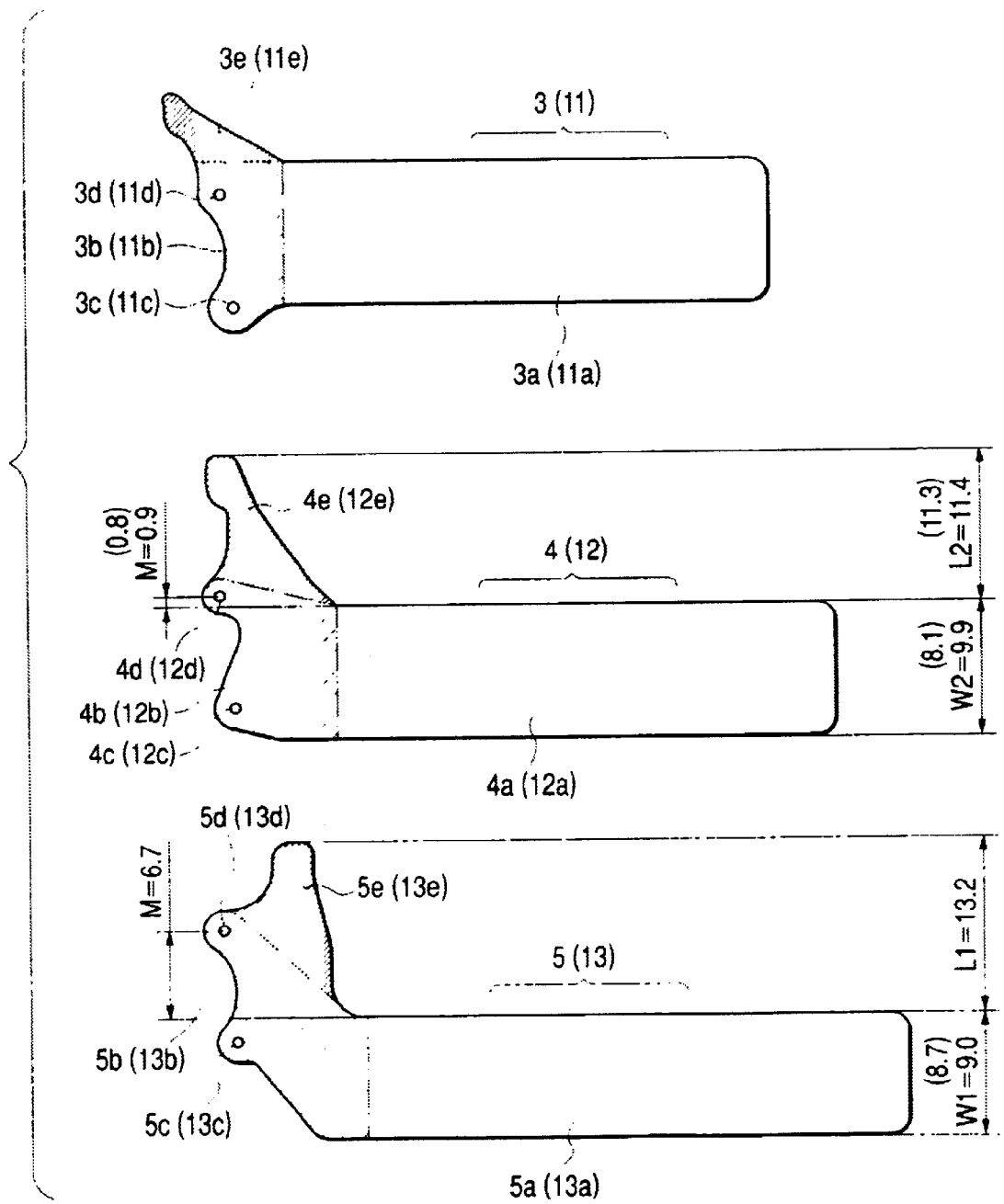
FIG. 5 is a view showing features of shapes of corner covering blades.

FIGS. 1 to 5 show the focal plane shutter apparatus which is the first embodiment of the present invention. FIG. 1 shows the running ready state (charge completion state), FIG. 2 the running end state, and FIGS. 3 and 4 are views explaining the effect by means of devising the blade holding position to the arm. FIG. 5 is a view showing shapes of the respective covering blades. Since the corresponding covering blades of the leading curtain and the trailing curtain are different only in the width of the strap-shaped blade portion but identical in the basic shape, each of portions of the covering blades for the trailing curtain will be denoted by a reference symbol in parentheses.

The focal plane shutter apparatus of the present embodiment is used as an exposure control apparatus for film cameras or digital cameras.

In these figures, numeral 1 designates a base plate (hereinafter referred to as a shutter ground board) in which a shutter aperture 1a is formed. Symbol 1b denotes an elongated hole defining an operating region of drive pin 20a of leading-curtain driving lever 20 described hereinafter.

Numeral 20 designates the leading-curtain driving lever, which is a lever providing running energy by spring energy or the like for the leading-curtain blade unit. The drive pin 20a of this leading-curtain driving lever 20 engages with a leading-curtain first arm 6 described hereinafter.

Symbol 1c designates an elongated hole defining an operating region of drive pin 21a of trailing-curtain driving lever 21 described hereinafter.

Numeral 21 denotes the trailing-curtain driving lever, which is a lever providing running energy by spring energy or the like for the trailing-curtain blade unit. The drive pin 21a of this trailing-curtain driving lever 21 engages with a trailing-curtain second arm 14 described hereinafter.

Numeral 2 represents a leading-curtain slit forming blade (first leading blade), in which symbol 2a indicates a leading-curtain slit forming edge and symbol 2b an end of the leading-curtain slit forming edge 2a on the arm base end side.

Numerals 3 to 5 denote leading-curtain covering blades, which will be referred to hereinafter in order as the second leading blade for numeral 3, the third leading blade for numeral 4, and the fourth leading blade for numeral 5.

Numeral 6 represents the leading-curtain first arm, a base end 6b of which is mounted so as to be rotatable about a shaft 1d provided on the shutter ground board 1 and which rotatably couples with and supports the leading-curtain slit forming blade 2 through caulking dowel 8a provided on the distal end side of the arm.

Symbol 6a is a hole through which the drive pin 20a of the leading-curtain driving lever 20 is allowed to pass without play in the driving direction, and power is transmitted from the leading-curtain driving lever 20 whose axis of rotation is coaxial with the shaft 1d, through this hole 6a to the first leading-curtain arm 6.

Numeral 7 denotes a second leading-curtain arm, a base end 7b of which is mounted so as to be rotatable around a shaft 1e provided on the shutter ground board 1 and which rotatably couples with and supports the leading-curtain slit forming blade (light shielding blade) 2 through caulking dowel 9a provided on the distal end side of the arm.

In this way, a parallel link is composed of the leading-curtain slit forming blade 2, the first leading-curtain arm 6, and the second leading-curtain arm 7 (and the shutter ground board 1).

Likewise, each of the second leading blade 3, the third leading blade 4, and the fourth leading blade 5 out of the leading-curtain covering blades (light shielding blades) is rotatably coupled and supported through their respective caulking dowels 8b and 9b, 8c and 9c, 8d and 9d in the middle portions of the first leading-curtain arm 6 and the second leading-curtain arm 7, thus constituting a parallel link.

Among the leading-curtain covering blades, as shown in FIG. 5, the second leading blade 3 is comprised of a blade main body portion 3a of strap shape (i.e., a shape whose two edges in the blade running direction extend in the direction nearly perpendicular to the blade running direction), a support portion 3b (a dashed hatch portion) provided with coupling portions (holes 3c, 3d described hereinafter) to the leading-curtain arms 6, 7, and a light shielding piece 3e (a hatch portion) adjacent to the support portion 3b, which extends in the almost opposite direction to the blade running direction in running from the running ready state (i.e., the expanded state) of FIG. 1.

The hole 3c formed in the support portion 3b, and the first leading-curtain arm 6 are coupled by caulking at the caulking dowel 8b, and the hole 3d and the second leading-curtain arm 7 are coupled by caulking at the caulking dowel 9b.

The second leading blade 3 is a blade with a third smallest travel in running of the blades in the leading curtain.

The third leading blade 4 is comprised of a blade main body portion 4a of strap shape, a support portion 4b (a dashed hatch portion) provided with coupling portions (holes 4c, 4d described hereinafter) to the leading-curtain arms 6, 7, and a light shielding piece 4e (a hatch portion) adjacent to the support portion 4b, which extends in the almost opposite direction to the blade running direction in running from the running ready state (expanded state).

The hole 4c formed in the support portion 4b, and the first leading-curtain arm 6 are coupled by caulking at the caulking dowel 8c, and the hole 4d and the second leading-curtain arm 7 are coupled by caulking at the caulking dowel 9c.

The third leading blade 4 is a blade with a second smallest travel in running of the blades in the leading curtain.

Here the light shielding pieces overlap with each other so as to effect light shielding on the blade unit arm side 1a' of the shutter aperture in the expanded state of the leading-curtain blade unit and in the middle of running to the superimposed state thereof.

The hole 4d of the third leading blade 4 to be coupled to the second leading-curtain arm 7 is located M (=0.9 mm) outside in the blade running direction with respect to a region of a lateral extension of the width W2 in the running direction (=9.9 mm) of the blade main body portion 4a.

Further, as shown in FIG. 5, there is the relation of magnitude of L2>W2 between the length L2 (=11.4 mm) of the projection of the light shielding piece 4e from the blade main body portion 4a and the width W2 (=9.9 mm) in the running direction of the blade main body portion 4a.

The fourth blade 5 is comprised of a blade main body portion 5a of strap shape, a support portion 5b (a dashed hatch portion) provided with coupling portions (holes 5c, 5d described hereinafter) to the leading-curtain arms 6, 7, and a light shielding piece 5e (a hatch portion) adjacent to the support portion 5b, which projects in the almost opposite direction to the blade running direction in running from the running ready state (expanded state).

The hole 5c formed in the support portion 5b, and the first leading-curtain arm 6 are coupled by caulking at the caulking dowel 8d, and the hole 5d and the second leading-curtain arm 7 are coupled by caulking at the caulking dowel 9d.

The fourth leading blade 5 is a blade with the smallest travel in running of the blades in the leading curtain.

The hole 5d of the fourth leading blade 5 to be coupled to the second leading-curtain arm 7 is located M (=6.7 mm) outside in the blade running direction with respect to a region of a lateral extension of the width W1 in the running direction (=9.0 mm) of the blade main body portion 5a.

Further, there is the relation of magnitude of L1>W1 between the length L1 (=13.2 mm) of the projection of the light shielding piece 5e from the blade main body portion 5a and the width W1 (=9.0 mm) in the running direction of the blade main body portion 5a.

In the running end state (i.e., the leading-curtain superimposed state) shown in FIG. 2, the distal end of the light shielding piece 3e (hatch portion) of the second leading blade 3 is interposed between the coupling portion of the third leading blade 4 to the second leading-curtain arm 7 (i.e., the portion coupled through the caulking dowel 9c) and the coupling portion of the fourth leading blade 5 to the second leading-curtain arm 7 (i.e., the portion coupled through the caulking dowel 9d). This allows the length and area of the light shielding piece 3e to be set to necessary and sufficient values by effectively making use of the space between the foregoing coupling portions.

The leading-curtain driving lever 20 rotates about an axis of rotation at an axis on an extension of the shaft 1d. A pivoting radius of the drive pin 20a around the shaft 1d is set smaller than a pivoting radius of the caulking dowel 8d for the fourth leading blade located at the inmost position on the first leading-curtain arm 6. The above described the structure of the leading-curtain blade unit.

In the running ready state of FIG. 1, the end 2b on the arm base end side in the slit forming edge 2a of the leading-curtain slit forming blade 2 is located outside the operating region of the drive pin 21a so as to avoid interference with the drive pin 21a of the trailing-curtain driving lever 21.

In the running end state of FIG. 2, the end 2b on the arm base end side in the slit forming edge 2a of the leading-curtain slit forming blade 2 is located within the operating region of the drive pin 20a of the leading-curtain driving lever 20.

On the other hand, the trailing-curtain blade unit is constructed in structure similar to that of the leading-curtain blade unit. Numeral 10 designates a trailing-curtain slit forming blade, in which symbol 10a represents a trailing-curtain slit forming edge and symbol 10b an end on the arm base end side in the trailing-curtain slit forming edge.

Numerals 11 to 13 denote trailing-curtain covering blades, which will be referred to hereinafter in order as the second trailing blade for numeral 11, the third trailing blade for numeral 12, and the fourth trailing blade for numeral 13.

Numeral 14 represents a first trailing-curtain arm, a base end 14b of which is mounted so as to be rotatable around a shaft 1f provided on the shutter ground board 1 and which rotatably couples with and supports the trailing-curtain slit forming blade 10 through a caulking dowel 16a provided on the distal end side of the arm.

Symbol 14a indicates a hole through which the drive pin 21a of the trailing-curtain driving lever 21 is made to pass without play in the driving direction, and the power is transmitted from the trailing-curtain driving lever 21 whose axis of rotation is coaxial with the shaft 1f, through the hole 14a to the first trailing-curtain arm 14.

Numeral 15 denotes a second trailing-curtain arm, a base end 15b of which is mounted so as to be rotatable around a shaft 1g provided on the shutter ground board 1 and which rotatably couples with and supports the trailing-curtain slit forming blade 10 through a caulking dowel 17a provided on the distal end side of the arm.

In this way a parallel link is composed of the trailing-curtain slit forming blade 10, the first trailing-curtain arm 14, and the second trailing-curtain arm 15 (and the shutter ground board 1).

Likewise, each of the second trailing blade 11, the third trailing blade 12, and the fourth trailing blade 13 out of the trailing-curtain covering blades is rotatably coupled and supported through their respective caulking dowels 16b and 17b, 16c and 17c, 16d and 17d in the middle portions of the first trailing-curtain arm 14 and the second trailing-curtain arm 15, thereby composing a parallel link.

Among the trailing-curtain covering blades, the second trailing blade 11 is comprised of a blade main body portion 11a of strap shape, a support portion 11b (a dashed hatch portion) provided with coupling portions (holes 11c, 11d described hereinafter) to the trailing-curtain arms 14, 15, and a light shielding piece 11e (a hatch portion) adjacent to the support portion 11b, which projects in the almost opposite direction to the blade running direction in running from the running ready state (i.e., the superimposed state).

The hole 11c formed in the support portion 11b, and the first trailing-curtain arm 14 are coupled by caulking at the caulking dowel 16b, and the hole 11d and the second trailing-curtain arm 15 are coupled by caulking at the caulking dowel 17b.

The second trailing blade 11 is a blade with a third smallest travel in running of the blades in the trailing curtain.

The third trailing blade 12 is comprised of a blade main body portion 12a of strap shape, a support portion 12b (a dashed hatch portion) provided with coupling portions (holes 12c, 12d described hereinafter) to the trailing-curtain arms 14, 15, and a light shielding piece 12e (a hatch portion) adjacent to the support portion 12b, which projects in the almost opposite direction to the blade running direction in running from the running ready state (superimposed state).

The hole 12c formed in the support portion 12b, and the first trailing-curtain arm 14 are coupled by caulking at the caulking dowel 16c, and the hole 12d and the second trailing-curtain arm 15 are coupled by caulking at the caulking dowel 17c.

The third trailing blade 12 is a blade with a second smallest travel in running of the blades in the trailing curtain.

Here the light shielding pieces overlap with each other in the expanded state of the trailing-curtain blade unit and in the middle of running to the superimposed state to effect the light shielding on the blade unit arm side 1a' of the shutter aperture.

The hole 12d of the third trailing blade 12 to be coupled to the second trailing-curtain arm 15 is located M (=0.9 mm) outside in the blade running direction with respect to a region of a lateral extension of the width W2 in the running direction (=8.1 mm) of the blade main body portion 12a.

Further, there is the relation of magnitude of L2>W2 between the length L2 (=11.3 mm) of the projection of the light shielding piece 12e from the blade main body portion 12a and the width W2 (=8.1 mm) in the running direction of the blade main body portion 12a.

The fourth trailing blade 13 is comprised of a blade main body portion 13a of strap shape, a support portion 13b (a dashed hatch portion) provided with coupling portions (holes 13c, 13d described hereinafter) to the trailing-curtain arms 14, 15, and a light shielding piece 13e (a hatch portion) adjacent to the support portion 13b, which projects in the almost opposite direction to the blade running direction in running from the running ready state (superimposed state).

The hole 13c formed in the support portion 13b, and the first trailing-curtain arm 14 are coupled by caulking at the caulking dowel 16d, and the hole 13d and the second trailing-curtain arm 15 are coupled by caulking at the caulking dowel 17d.

The fourth trailing blade 13 is a blade with the smallest travel in running of the blades in the trailing curtain.

The hole 13d of the fourth trailing blade 13 to be coupled to the second trailing-curtain arm 15 is located M (=6.7 mm) outside in the blade running direction with respect to a region of a lateral extension of the width W1 in the running direction (=8.7 mm) of the blade main body portion 13a.

Further, there is the relation of magnitude of L1>W1 between the length L1 (=13.2 mm) of the projection of the light shielding piece 13e from the blade main body portion 13a and the width W1 (=8.7 mm) in the running direction of the blade main body portion 13a.

In the running ready state (trailing-curtain superimposed state) shown in FIG. 1, the distal end of the light shielding piece 11e (hatch portion) of the second trailing blade 11 is interposed between the coupling portion of the third trailing blade 12 to the second trailing-curtain arm 15 (i.e., the portion coupled through the caulking dowel 17c) and the coupling portion of the fourth trailing blade 13 to the second trailing-curtain arm 15 (i.e., the portion coupled through the caulking dowel 17d). This permits the length and area of the light shielding piece 11e to be set to necessary and sufficient values by effectively making use of the space between the foregoing coupling portions.

The trailing-curtain driving lever 21 rotates about an axis of rotation at an axis on an extension of the shaft 1f. A pivoting radius of the drive pin 21a around the shaft 1f is set smaller than a pivoting radius of the caulking dowel 16d for the fourth trailing blade located at the inmost position on the first trailing-curtain arm 14. The trailing-curtain blade unit is constructed as described above.

In the running ready state of FIG. 1, the end 10b on the arm base end side in the slit forming edge 10a of the trailing-curtain slit forming blade 10 is located inside the operating region of the drive pin 21a of the trailing-curtain driving lever 21.

In the running end state of FIG. 2, the end 10b on the arm base end side in the slit forming edge 10a of the trailing-curtain slit forming blade 10 is located outside the operating region of the drive pin 20a so as to avoid interference with the drive pin 20a of the leading-curtain driving lever 20.

In these leading-curtain and trailing-curtain blade units, the lengths of the arms are set short for downsizing. However, since the size of the shutter opening in the blade running direction is fixed, it becomes necessary to set large operating angles of operation of the arms in order to move the blades by the determined distances, where the arm lengths are set short in the parallel links.

As also described previously, when the blade unit of the four blade structure is constructed in such arrangement that in the blade superimposed state thereof the blade caulking dowels 117b, 117c, 117d on the second arm 115 hit the base end 114b and the blade caulking dowels 116c, 116d on the first arm 114, as shown in the first conventional example (FIGS. 21 and 22), in order to increase the rotating angles of the arms, the rotating angles of the arms cannot be increased and it is hard to downsize the shutter.

In order to increase the rotating angles of the arms, therefore, it is effective to employ the arrangement in which the blade caulking dowels 9b, 9c, 9d, 17b, 17c, 17d on the second leading-curtain arm 7 and on the second trailing-curtain arm 15 are alternately interposed so as not to hit the base end 6b, 14b and the blade caulking dowel 8d, 16d on the first leading-curtain arm 6 and on the first trailing-curtain arm 14, as shown in FIGS. 1 and 2.

Further, the downsizing effect becomes prominent when the caulking dowels 8c, 9c, 8d, 9d; 16c, 17c, 16d, 17d of at least two blades (the third leading blade 4, the fourth leading blade 5; the third trailing blade 12, the fourth trailing blade 13) placed near the arm base ends are arranged as near to the lateral edge 11 of the contour of the shutter ground board 1 as possible, and along the lateral edge 11.

Specifically, in the case of the trailing curtain in the first conventional example, the rotating angles of the arms cannot be increased and in the blade superimposed state the caulking dowels 116c, 117c, 116d, 117d of the two blades 112, 113 placed near the arm base ends cannot be arranged near the lateral edge 1011 of the contour of the shutter ground board, and along the lateral edge 1011 Therefore, the lateral distance between the blade caulking dowels 116c, 116d (and between 117c, 117d) is even as large as 3.08 mm, and the size (lateral size) of the shutter apparatus is also large in the direction perpendicular to the blade running direction. From this fact, it is readily speculated that the downsizing effect is not too much with an attempt to downsize the apparatus, following the arrangement relation of the blade caulking dowels and others similar to those in the first conventional example.

On the other hand, the present embodiment permits the rotating angles of the arms to be largely increased by the arrangement wherein the blade caulking dowels and others are alternately interposed in both the leading curtain and the trailing curtain, whereby in the blade superimposed state the caulking dowels 8c, 9c, 9d; 16c, 17c, 16d, 17d of the two blades (the third leading blade 4, the fourth leading blade 5; the third trailing blade 12, the fourth trailing blade 13) placed near the arm base ends can be arranged near the lateral edge 11 of the contour of the shutter ground board 1, and along the lateral edge 11. Therefore, the lateral distance between the blade caulking dowels 8c, 8d (and between 9c, 9d) of the leading curtain is 0.44 mm, and the lateral distance between the blade caulking dowels 16c, 16d (and between 17c, 17d) of the trailing-curtain is 0.77 mm.

In addition, taking the maximum angle of 4° for overcharge into consideration, these lateral distances can be made almost 0 (zero) mm in the superimposed state for both the leading curtain and the trailing curtain.

Accordingly, it is seen that the effect is extremely prominent for the downsizing of the shutter apparatus in the direction (the lateral size) perpendicular to the blade running direction.

The operation of the shutter apparatus of the present embodiment will be described below. In the running ready state of FIG. 1, the leading-curtain driving lever 20 and the trailing-curtain driving lever 21 are attracted and held by their respective time control magnets not shown.

At this time, the end 2b on the arm base end side in the slit forming edge 2a of the leading-curtain slit forming blade 2 is located outside the operating region of the drive pin 21a so as not to interfere with the drive pin 21a of the trailing-curtain driving lever 21 in the event that there occurs failure such as defective adhesion of the trailing curtain to the time control magnet or the like, so as to fail to hold the trailing curtain at the running ready position and that only the trailing curtain runs so as to close the shutter aperture.

The end 10b on the arm base end side in the slit forming edge 10a of the trailing-curtain slit forming blade 10 is located within the operating region of the drive pin 21a of the trailing-curtain driving lever 21, but it does not interfere with the drive pin 21a, because it moves away to the outside of the operating region of the drive pin 21a with the expanding operation of the trailing curtain to close the shutter aperture.

When the adhesion of the time control magnet for the leading curtain is first released by a shutter release signal, the leading-curtain blade unit rotates the first leading-curtain arm 6 and the second leading-curtain arm 7 clockwise by energy of an unrepresented leading-curtain driving spring which generates a clockwise torque on the leading-curtain driving lever 20.

With this operation, the leading-curtain slit forming blade 2 and the leading-curtain covering blades 3 to 5 run from top to bottom of the shutter aperture 1a while keeping the leading-curtain slit forming edge 2a and the leading-curtain covering blades 3 to 5 in parallel with the longer side 1h of the shutter aperture 1a by the action of the parallel link. In this way the leading curtain moves to the position of FIG. 2 so as to open the shutter aperture 1a.

After a predetermined time equivalent to a set exposure time has elapsed since the release of the attraction of the time control magnet for the leading curtain, the attraction of the time control magnet for the trailing curtain is released whereupon the trailing-curtain blade unit rotates the first trailing-curtain arm 14 and the second trailing-curtain arm 15 clockwise by energy of an unrepresented trailing-curtain driving spring which generates a clockwise torque on the trailing-curtain driving lever 21.

With this operation, the trailing-curtain slit forming blade 10 and the trailing-curtain covering blades 11 to 13 run from top to bottom of the shutter aperture 1a while keeping the trailing-curtain slit forming edge 10a and the trailing-curtain covering blades 11 to 13 in parallel with the longer side 1h of the shutter aperture 1a by the action of the parallel link. In this way the trailing curtain moves to the position of FIG. 2 so as to shut off the shutter aperture 1a, thereby ending exposure.

During the shutter charge, the leading curtain and the trailing curtain perform the operation of rotating the leading-curtain and trailing-curtain driving levers 20, 21 counterclockwise, which is the reverse of the above exposure operation, while moving the leading curtain ahead without opening the shutter aperture 1a, whereby the leading curtain and the trailing curtain move from the positions in FIG. 2 again to the positions in FIG. 1.

In the running end state of FIG. 2, the end 10b on the arm base end side in the slit forming edge 10a of the trailing-curtain slit forming blade 10 is located outside the operating region of the drive pin 20a so as not to interfere with the drive pin 20a of the leading-curtain driving lever 20 in the case where during the shutter charge the leading curtain moves ahead so as to close the shutter aperture 1a. Although the end 2b on the arm base end side in the slit forming edge 2a of the leading-curtain slit forming blade 2 is located within the operating region of the drive pin 20a, it does not interfere with the drive pin 20a, because it moves away to the outside of the operating region of the drive pin 20a with the expanding operation of the leading curtain to close the shutter aperture 1a.

Supposing the focal plane shutter apparatus in the present embodiment is mounted on a single-lens reflex camera using 135-format silver film, the vertical size A of the shutter aperture 1a is 24.7 mm and the lateral size thereof 36.6 mm. Since the size of the shutter aperture 1a in this format is determined by Standards, in order to decrease the size of the shutter apparatus, it is necessary to decrease the sizes of the components around the shutter aperture 1a.

Thus described below are points of focus for downsizing of the shutter apparatus. Here, let B be a length from the end face on the arm base end side (the left side on the plane of FIG. 1) in the shutter aperture 1a to the end face on the side where the arm base ends are supported (on the left side on the plane of FIG. 1) in the shutter ground board 1, and let C be a length from the end face on the blade distal end side (the right side on the plane of FIG. 1) in the shutter aperture 1a to the end face on the blade distal end side (the right side on the plane of FIG. 1) in the shutter ground board 1.

Further, let D be a length from the center of rotation at the arm base end to the center of rotation of the caulking dowel supporting the slit forming blade at the distal end of the arm, let θ be the maximum operating angle of the arm around the center of rotation on the base end side, and let E be a length between the first arm and the second arm of the parallel link consisting of the first arm and the second arm.

(1) The number of blades rotatably coupled and supported on the arms

Figure 21:
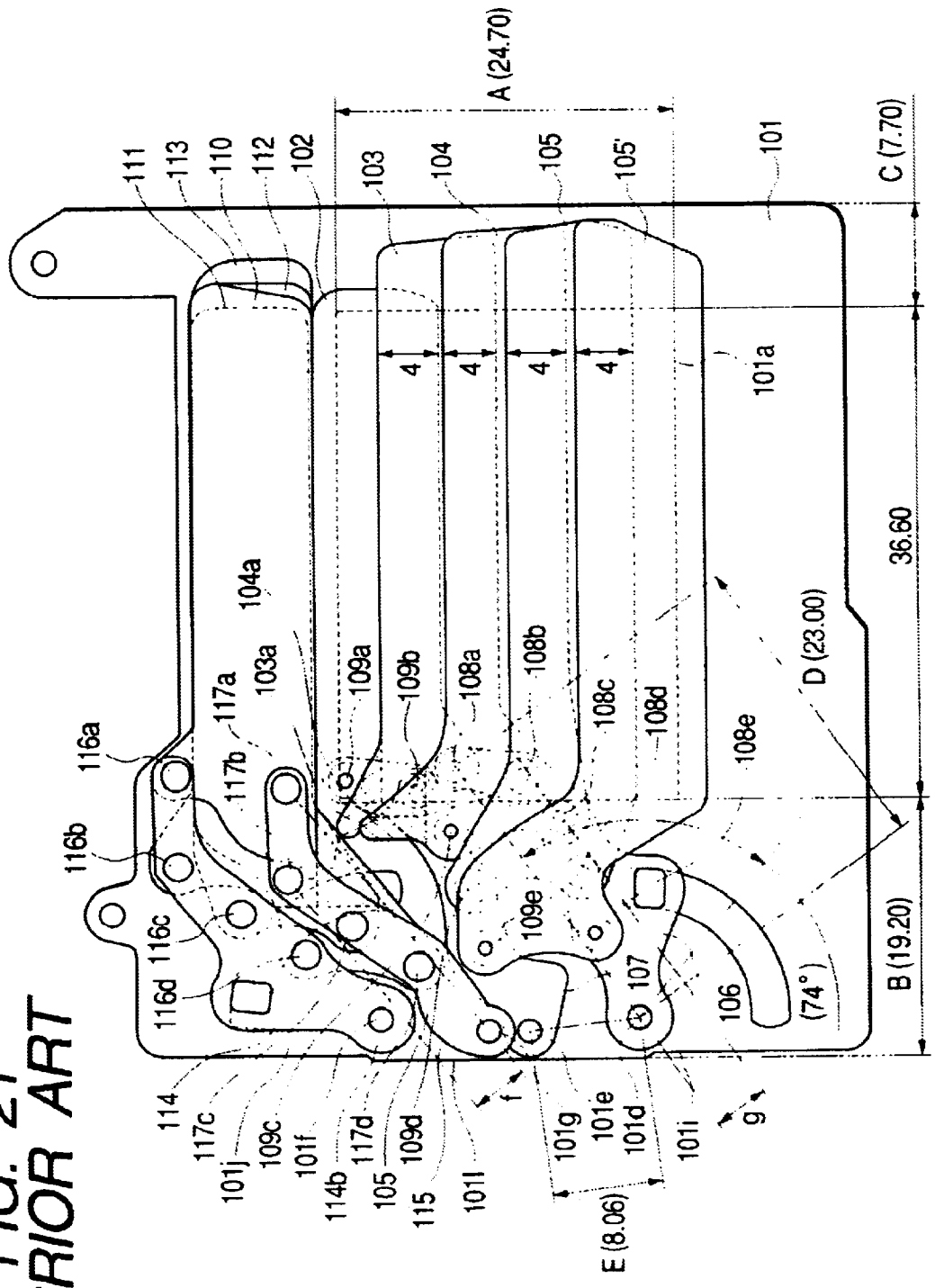
FIG. 21 is a front view of the conventional focal plane shutter (first conventional example) in the running ready state.

While in the first embodiment the leading curtain and the trailing curtain both are constructed in the four blade structure, the width of each blade can be smaller in the case of the five blade structure where five blades are supported on the arms, as in the case of the leading curtain of the first conventional example, under the condition that the predetermined blade overlapping amount necessary for light shielding (4 mm in the first embodiment, as shown in FIG. 1, or 4 mm in the first conventional example, as shown in FIG. 21) is secured in the expanded state of the blades wherein the leading curtain closes the shutter aperture in the winding charge completion state of the camera (next shooting is awaited in this state in the recent motor-integrated cameras). Accordingly, the larger the number of blades, the smaller the size in the vertical direction equivalent to the blade running direction of the shutter, because the blades can be folded in the smaller size in the blade storage state opening the shutter aperture.

Simply speaking, the larger the number of blades, the longer the arm lengths become because of increase in the number of blade supporting portions, however. Therefore, the size of the shutter becomes larger in the lateral direction perpendicular to the blade running direction. In the case where the arm lengths are kept as short as possible (which is equivalent to the first conventional example), the margin on the arms becomes smaller by the degree of increase in the number of blade supporting portions, and it thus becomes difficult to make the lateral size of the shutter smaller.

The number of mutually overlapping portions of the blades is one greater in the five blade structure than in the four blade structure, the total blade area is also greater, and the number of blade coupling portions is also one greater, so as to increase the total inertia of the blade unit securely, which is disadvantageous to fast running.

On the other hand, in the case of the three blade structure, the number of blade coupling portions is decreased, so as to increase the margin on the arms, which is advantageous to further decrease in the lateral size of the shutter.

Under the condition that the predetermined blade overlapping amount (e.g., 4 mm) is secured in the expanded state of the blades to close the shutter aperture, however, the blades cannot be folded in small size in the blade storage state opening the shutter aperture, and thus the size of the shutter becomes large in the vertical direction equivalent to the blade running direction. If the vertical length is decreased the mutual overlapping amount of the blades will become smaller in the expanded state of the blades, so as to result in failing to maintain the light shielding performance. After all, the three blade structure has an ill balance between the vertical and lateral sizes of the shutter, as described above, and it is thus hard for the shutter to be mounted on the camera.

For actually securing the blade overlapping amount capable of substantiating the satisfactory light shielding performance, achieving a good balance of the aspect ratio of the shutter, and effectively decreasing the lateral length, the four blade structure is optimal for both the leading curtain and the trailing curtain as in the first embodiment.

(2) Arm length (length D from the center of rotation at the arm base end to the center of rotation of the caulking dowel for coupling of the slit forming blade at the distal end of the arm)

The foregoing arm length is set to such a minimum length as to permit the arm to support the blades of the four blade structure rotatably and to move the slit forming blade 2 or 10 sufficiently across the vertical size A of the shutter aperture 1a.

(3) Maximum operating angle θ around the center of rotation of the arm on the base end side As the arm length D is decreased in (2) above, the angle θ naturally increases according thereto in order to make the moving distance of the slit forming blade clear the vertical size A of the shutter aperture 1a.

(4) Length E between the first arm and the second arm

With increase in the maximum operating angle θ of the arms, there arises a problem that the sufficient operating angle is not assured because interference will occur between the first arm and the second arm, particularly, between the blade coupling portions, in the expanded state of the blades and in the storage (superposition) state if the length between the arms is kept as before.

Another problem is that with increase in the arm operating angle, more part of the blade tip side opposite to the blade coupling portions of the slit forming blade 2, 10 goes into the shutter aperture 1a in the blade expanded state and in a state close to the storage (superimposed) state. This means that there is fitting play at the blade coupling portions and this play is enlarged at the position far from the coupling portions, so as to degrade the parallelism of the slit forming blade 2, 10 (slit forming edge 2a, 10a).

In order to solve the two problems described above, the distance between the first arm and the second arm is enlarged. From the properties of the parallel link, the stability of the parallelism is improved during the operation of the slit forming blade supported by the arms when the span is expanded between the arms composing the parallel link.

(5) Length C from the end face on the blade distal end side of the shutter aperture 1a to the end face on the blade distal end side in the shutter ground board 1

Decrease in the arm length D and increase in the arm maximum operating angle θ will increase displacement amounts of the blades (particularly, the slit forming blade) in the direction perpendicular to the running direction in the opening and closing operation, which is disadvantageous to decrease of the length C.

However, the length C can be decreased when the superposition amount between the distal end of each blade and the portion around the shutter aperture 1a or the cover plate in the shutter ground board 1 in the expanded state of the blades is kept as comparable to that before in order to ensure the light shielding performance and prevent the blade from slipping off when a photographer carelessly pushes it with a finger or the like, by decreasing the radius R of the corner (2c, 10c) of the slit forming edge on the distal end side of the slit forming blade to the necessary minimum so as to form the slit forming edge to the close vicinity of the tip of the blade, by shortening the length of the slit forming blade, and by simplifying the tip shape of each blade to a linear shape along the end face of the shutter ground board 1.

(6) Arrangement of the blade coupling portions (blade caulking dowels) on the arms FIGS. 3 and 4 show the effect concerning the arrangement of the blade coupling portions on the arms. FIG. 3 is a view for explaining the slit forming edge and FIG. 4 a view for explaining the light shielding portions, the both being plan views in the middle of running of the shutter. Since the same structure applies to both the leading curtain and the trailing curtain, only the trailing curtain will be described herein.

In these figures, symbol 10b designates the end on the arm base end side of the slit forming edge 10a in the trailing-curtain slit forming blade 10, and numeral 18 (indicated by a chain double-dashed line) a caulking dowel for the third trailing blade 12 arranged in accordance with the prior art. Symbol 11a denotes the light shielding piece of the second trailing blade 11 and 12a the light shielding piece of the third trailing blade 12.

Figure 22:
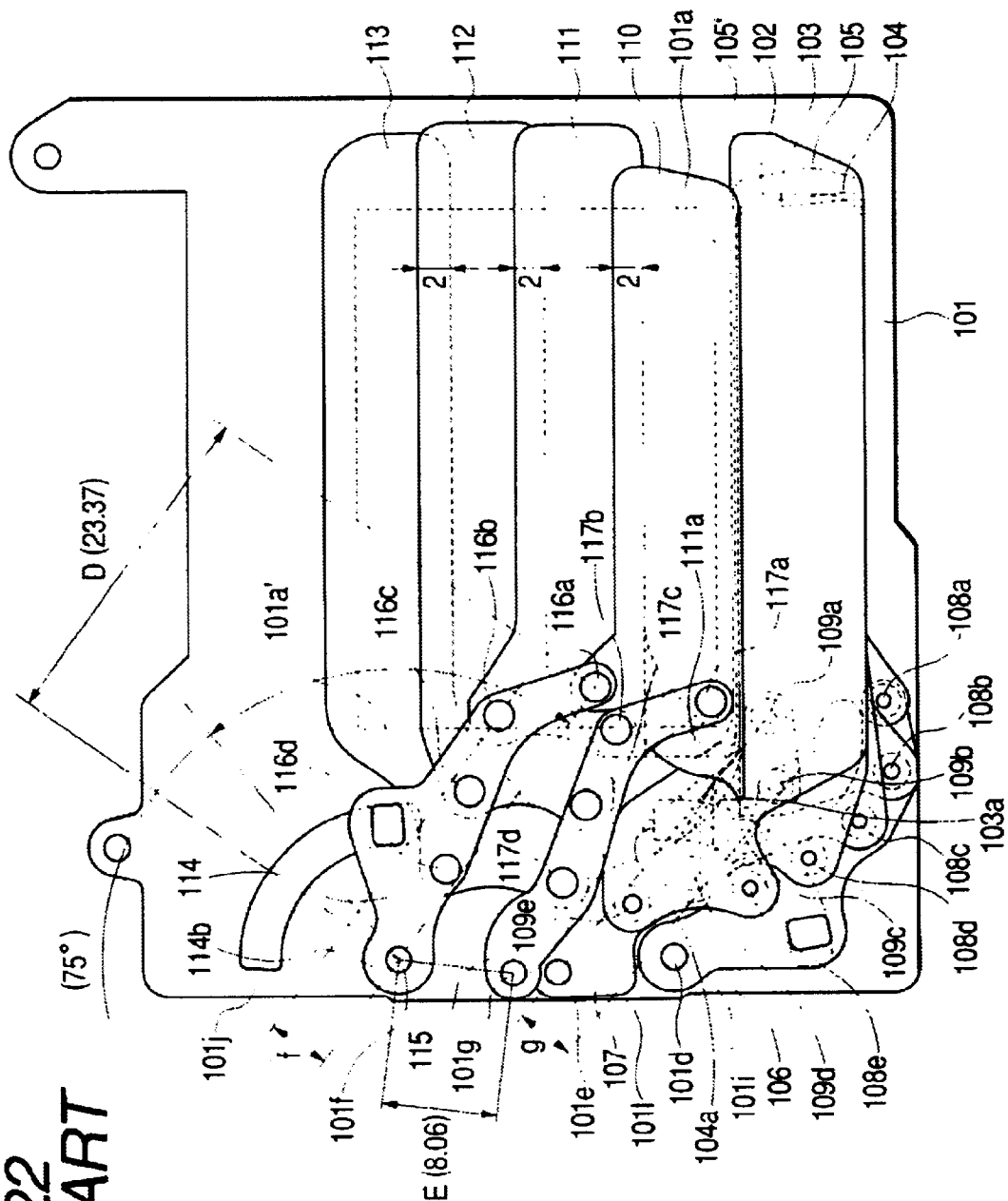
FIG. 22 is a front view of the conventional focal plane shutter (first conventional example) in the running end state.

In the arrangement of the blade coupling portions (blade caulking dowels) on the conventional arms, as shown in FIGS. 21 and 22, when in the trailing curtain of the four blade structure comparison is made among distances from a line connecting the center of rotation of the base end of each arm (101f, 101g) to the center of rotation of the coupling portion (116a, 117a) of the slit forming blade at the distal end of the arm, the center of rotation of the coupling portion (116b or 117b) of the second trailing blade (the distance of which is indicated by f in the drawings) is most distant out of all the centers of rotation of the blade coupling portions, followed by those for the third blade and for the fourth blade in the stated order.

On the other hand, in the case of the leading curtain of the five blade structure, when comparison is made similarly among distances from a line connecting the center of rotation (101d, 101e) of the base portion of each arm to the center of rotation of the coupling portion (108a, 109a) of the slit forming blade at the distal end of the arm, the center of rotation of the coupling portion (108c, 109c) of the third leading blade (the distance of which is indicated by g in the drawings) is most distant out of all the rotational centers of the blade coupling portions, followed by those for the second leading blade, for the fourth leading blade, and for the fifth leading blade in the stated order.

As described previously, the four blade structure is optimal for both the leading curtain and the trailing curtain in order to effectively decrease the lateral length of the shutter apparatus. Therefore, where the blades are considered in the four blade structure and where the blade coupling portions to the arms are arranged in accordance with the prior art, the location of the caulking dowel 18 for the third trailing blade is determined as indicated by the chain double-dashed line in FIG. 3.

In this case, the end 10b on the arm base end side of the slit forming edge 10a in the slit forming blade 10 interferes with the caulking dowel 18 for the third trailing blade. Therefore, the end 10b on the arm base end side in the slit forming edge 10a has to be moved by about 1.5 mm toward the tip of the blade, up to the position of 10b', as indicated by arrows.

In this arrangement, the locus of motion of the outermost portion of the end 10b' on the arm base end side in the slit forming edge 10a is given by H and enters the shutter aperture 1a, which fails in formation of the slit as a shutter.

In order to avoid it, it is necessary to lengthen the distal end of the slit forming blade 10 by about 1.5 mm and shift the entire blade unit toward the arm base end side (to the left in the drawing) by about 1.5 mm relative to the shutter aperture 1a.

In addition thereto, the light shielding piece 11a of the second trailing blade 11 also interferes with the caulking dowel 18 for the third trailing blade, and it is thus necessary to let the light shielding piece 11a away therefrom.

For example, if the light shielding piece 11a is cut away as indicated by hatching in the figure, there will appear a portion 19 (a gap formed between the slit forming blade 10 and the light shielding piece 12a of the third trailing blade 12) failing to effect light shielding of the aperture in the middle of running of the blade unit as shown in FIG. 4, thereby damaging the shutter function.

Therefore, the problems are not solved by simply increasing the lateral size of the shutter by about 1.5 mm from that in the first embodiment, and the decrease of the lateral size is very small as compared with the shutter in the first conventional example.

In contrast to it, in the case of the arrangement of the blade coupling portions (blade caulking dowels) on the arms in the first embodiment, when comparison is made similarly among distances from a line connecting the center of rotation (1f, 1g) of the base end of each arm to the center of rotation of the coupling portion (16a, 17a) of the slit forming blade at the distal end of the arm, the center of rotation of the coupling portion (16c, 17c) of the third trailing blade (the distance of which is indicated by F in the figures) is most distant out of all the centers of rotation of the blade coupling portions, followed by those for the second trailing blade and for the fourth trailing blade in the stated order.

This arrangement clears the aforementioned interference between the end 10b on the arm base end side in the slit forming edge 10a of the slit forming blade 10 and the caulking dowel 17c for the third trailing blade and prevents the locus of motion of the outermost portion of the end 10b on the arm base end side in the slit forming edge 10a from entering the inside of the shutter aperture 1a as indicated by I.

Further, the light shielding piece 11a of the second trailing blade 11 is also prevented from interfering with the caulking dowel 17c for the third trailing blade, and the sufficiently large light shielding piece 11a can be formed, which also ensures the light shielding in the middle of running.

By this arrangement, the shutter apparatus of the first embodiment can be made 6 mm smaller in the lateral size than the shutter apparatus of the first conventional example.

The size of each portion will be described below in detail. First, the length B is 19.2 mm in the first conventional example shown in FIGS. 21 and 22, and can be decreased by about 1 mm by decreasing the diameter of the blade caulking dowels and decreasing the margin during and after movement between the blades. However, the decrease of the length B over it will cause the arm-side end in the slit forming edge of the slit forming blade to enter the inside of the shutter aperture, which will result in failing to form the rectangular slit by the slit forming edges of the leading curtain and the trailing curtain and the shutter aperture, thus failing to establish the shutter function. Accordingly, the technology of the present invention is necessary for the decrease of not less than 2 mm in the length B.

On the other hand, the shutter close to the optimum balance, downsized by the technology of the present invention, is the one described in the first embodiment, in which the length B is 14.2 mm. In order to seek for the limit of further decrease, the material of the rotational center shafts 1d, 1e, 1f, 1g at the arm base ends is changed from a plastic material, which permits integral molding with the shutter ground board 1, to metal such as stainless steel or the like, and the diameter of the shafts is decreased from $\phi 1.6$ mm to $\phi 1.0$ mm.

In connection therewith, the radius of the circumference of the base end of each arm in the leading curtain and the trailing curtain is made 0.3 mm smaller. Then the end face of the shutter ground board 1 on the left side on the plane of FIG. 1 can be shifted to the right by that degree.

The decrease of 2 mm from the first conventional example is the upper limit for the length B and the decrease of 0.3 mm from the first embodiment is the lower limit for the length B. Therefore, the length B can be expressed by the relation as follows.

$$\{(14.2-0.3)/24.7\}A \leq B \leq \{(19.2-2)/24.7\}A \therefore 0.56A \leq B \leq 0.70A \quad (1)$$

Thus the technology of the present invention permits the length B to be freely selected within the range of the length B defined by Eq (1) above.

The following will describe the length C. In the first conventional example shown in FIGS. 21 and 22, the length C is 7.7 mm. Supposing the minimum decrease is 0.3 mm by which the downsizing effect can be recognized even a little, the upper limit length will be 7.4 mm.

Since the length C is almost determined by the loci of the distal ends of the slit forming blades, the decrease in the arm length D and the increase in the arm maximum operating angle θ as in the present invention will increase the displacement amounts in the direction perpendicular to the running direction of the blades (particularly, the slit forming blades) in the opening and closing operation, as discussed in foregoing (5). This is disadvantageous to decrease of the length C.

However, the length C can be 6.7 mm in the shutter apparatus of the first embodiment close to the optimal balance, downsized by the technology of the present invention.

For seeking for the limit of further decrease, if the radii R of the corners of the slit forming edges on the distal end side of the slit forming blades are reduced to the necessary minimum (or to almost zero) and if the slit forming edges are extended to the dead end at the distal end of the blades, the length can be cut by 0.7 mm more at the distal end of the slit forming blades.

When the distal end of the blades other than the slit forming blades is also cut similarly by about 0.7 mm, the lower limit of the length C will be 6.0 mm. If the blades are made smaller over the lower limit, the slit forming edges will enter the inside of the shutter aperture 1a during running of the blades, so as to damage the function of the shutter. The superposition amount between the distal end of each blade and the peripheral portion of the shutter aperture 1a or the cover plate in the shutter ground board 1 in the expanded state of the blades cannot be secured, either, so as to fail to assure the necessary minimum for assuring the light shielding performance and for preventing the blade from slipping off when it is carelessly pushed by the photographer.

Accordingly, the length C can be expressed by the relation as follows.

$$(6.0/24.7)A \leq C \leq (7.4/24.7)A \therefore 0.24A \leq C \leq 0.30A \quad (2)$$

Therefore, the technology of the present invention permits the length C to be freely selected within the range of the length C defined by Eq (2) above.

The following will describe the length D. In the first conventional example shown in FIGS. 21 and 22, the length D is 23.0 mm. When the technology of the present invention is applied in correspondence to the aforementioned decrease of the length B from 19.2 mm in the first conventional example by 2 mm, the length D becomes 22.2 mm, as shown in FIG. 6.

Figure 6:
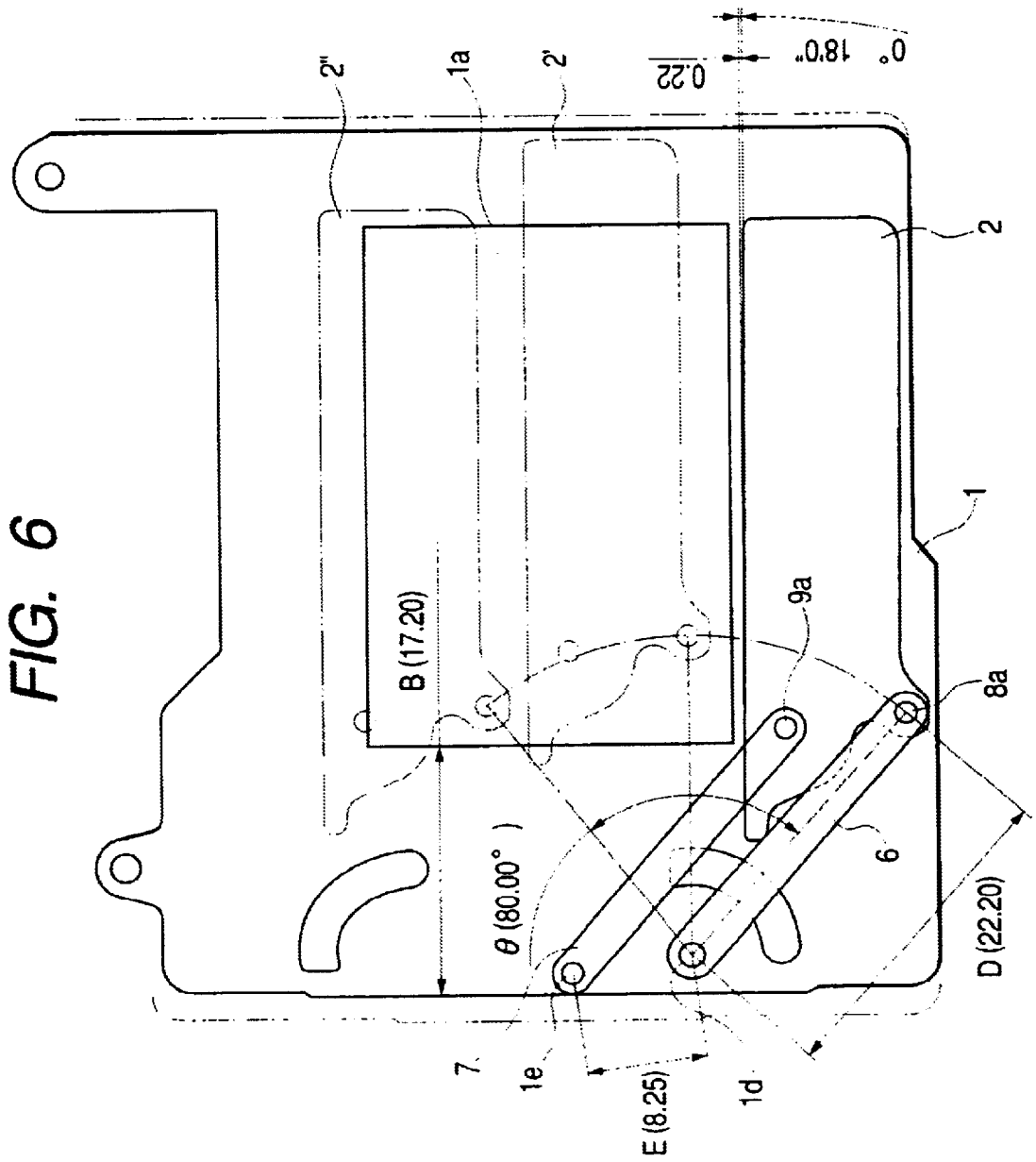
FIG. 6 is a front view of an example of the focal plane shutter in the running end state constructed using the technology in the first embodiment of the present invention, which schematically shows the balance between the arms and the slit forming blade of the leading curtain and the inclination of the slit forming edge with respect to the dimensions of the ground board.

FIG. 6 is a view of the shutter apparatus in the running end state, schematically showing the balance between the leading-curtain arms and the leading-curtain slit forming blade and the inclination of the slit forming edge with respect to the size of the shutter ground board 1, in which 2' indicated by a chain double-dashed line represents a state in which the slit forming blade has moved to the most forward position and 2" indicated by another chain double-dashed line represents a state in which the slit forming blade has moved to the running ready position. Since the same also applies similarly to the trailing curtain, the description thereof is omitted herein.

In the shutter apparatus of the first embodiment close to the optimal balance, downsized by the technology of the present invention, the length D is 19.8 mm. For seeking for the limit of further decrease, the length D can be decreased by 0.5 mm more, to 19.3 mm as shown in FIG. 7.

This becomes feasible by increasing the arm maximum operating angle θ, increasing the clearance amount by making slimmer the shapes of the first and second arms, which would interfere with each other without any change, decreasing the diameter of the blade caulking dowels as well, relieving the constraints on the shape of each blade for the light shielding piece and others near the arms, and decreasing the overlapping amount between the adjacent blades in the expanded state of the blades to the necessary minimum.

Figure 7:
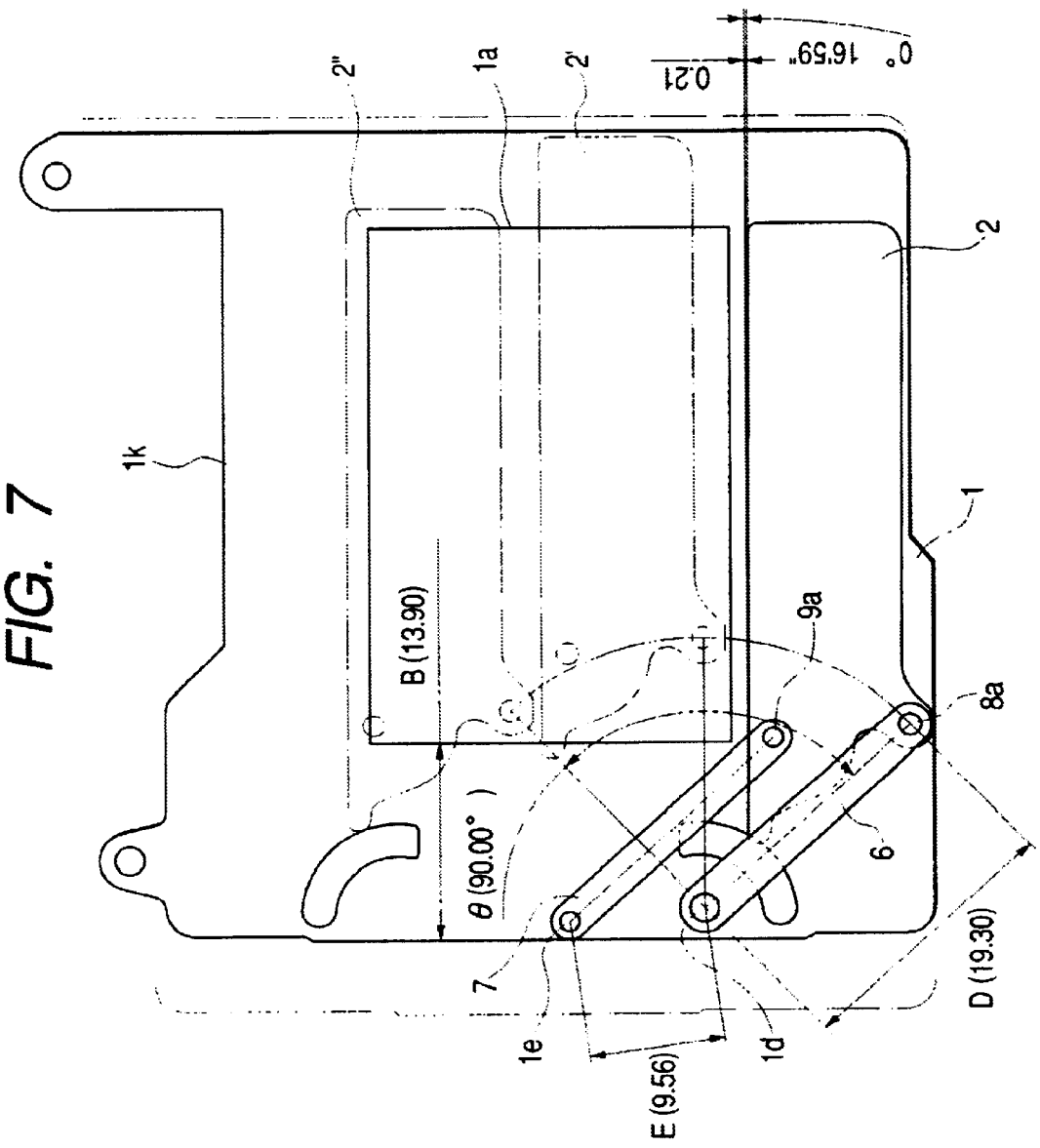
FIG. 7 is a front view of another example of the focal plane shutter in the running end state constructed using the technology in the first embodiment of the present invention, which schematically shows the balance between the arms and the slit forming blade of the leading curtain and the inclination of the slit forming edge with respect to the dimensions of the ground board.

FIG. 7 is a view of the shutter apparatus in the running end state, schematically showing the balance between the leading-curtain arms and the leading-curtain slit forming blade and the inclination of the slit forming edge with respect to the size of the shutter ground board 1, in which 2' indicated by a chain double-dashed line represents a state in which the slit forming blade has moved to the most forward position and 2" indicated by another chain double-dashed line represents a state in which the slit forming blade has moved to the running ready position. Since the same also applies similarly to the trailing curtain, the description thereof is omitted herein.

Further decrease of the length D over it will make it difficult to support each blade in terms of the space. In addition, if the arm shape is made further slimmer and if the diameter of the blade caulking dowels is made further smaller, the arm strength and the blade caulking strength will become too low, so as to result in a breakdown. The light shielding will also become insufficient and the apparatus will not function well as a shutter.

Accordingly, the length D can be expressed by the relation as follows.

$$(19.3/24.7)A \leq D \leq (22.2/24.7)A \therefore 0.78A \leq D \leq 0.90A \quad (3)$$

The technology of the present invention permits the length D to be freely selected within the range of the length D defined by Eq (3) above.

The following will describe the arm maximum operating angle θ. In the first conventional example shown in FIGS. 21 and 22, the arm operating angles from the running end state to the running ready state are 74° to 75°. Supposing the overcharge is 4° at the maximum (the overcharge varies between 0° and 4°, depending upon adjuster rollers of unrepresented charge mechanisms among individual shutters), the total arm operating angle will be 79°.

When the technology of the present invention is applied corresponding to the aforementioned length B of 17.2 mm and length D of 22.2 mm, the lower limit of the arm maximum operating angle θ becomes 80°+(overcharge of 0° to 4°), as shown in FIG. 6. In the shutter apparatus of the first embodiment close to the optimal balance, downsized by the technology of the present invention, θ becomes 87°+

(overcharge of 0° to 4°). When the limit of further decrease is sought for, θ becomes 90°+(overcharge of 0° to 4°) corresponding to the foregoing length D of 19.3 mm, as shown in FIG. 7.

Accordingly, θ can be expressed by the relation as follows.

$$80° \leq \theta \leq 94° \quad (4)$$

The technology of the present invention permits the value of θ to be freely selected within the range of θ defined by Eq (4) above.

The increase of θ in this way limits the positions (6a, 14a) where the drive pins 20a, 21a of the leading-curtain driving lever 20 and the trailing-curtain driving lever 21, which supply the running energy by spring energy or the like to the leading curtain and to the trailing curtain, are fitted in the first arms 6, 14. Namely, since the leading-curtain and trailing-curtain driving levers 20, 21 rotate around the same axis as the rotational centers 1d, 1f of the first arms 6, 14, increase in the pivoting radii of the drive pins 20a, 21a expands the regions occupied by the operational loci of the drive pins with increase in θ, so as to decrease degrees of freedom for the arrangement of blades, which is disadvantageous to downsizing.

It is thus desired to minimize the pivoting radii of the drive pins. In addition, it is preferable to set the position of each drive pin in the running end state of the leading curtain or during the period from the charge end to the overcharge state of the trailing curtain (the position 20a in FIG. 2 or the position 21a in FIG. 1), as close to the left edge of the shutter ground board 1 as possible.

The recent cameras employ as a film feeding mechanism, a method of winding the film by making use of frictional force on a rubber-coated spool, instead of use of a sprocket, and are configured to index each frame of the film by use of a photosensor instead of detection of a rotation amount of the sprocket. In the conventional cameras, therefore, there were upper and lower clearance areas (101i, 101j shown in FIGS. 21 and 22) provided at the left edge of the shutter ground board from a certain region so as to match the shape of the sprocket present on the left side of the shutter with the wall of the unrepresented camera body in between.

In the shutter apparatus of the first embodiment of the present invention, noting that there is no need for providing the clearance areas for the sprocket, the pivoting radii of the drive pins are made as small as possible, and the position of each drive pin in the running end state of the leading curtain or during the period from the end of charge to the overcharge state of the trailing curtain (the position 20a in FIG. 2 or the position 21a in FIG. 1) is set close to the left edge of the shutter ground board 1 so as to be located immediately below in the leading curtain or immediately above in the trailing curtain with respect to the rotational center 1d, 1f of the first arm 6, 14.

Namely, the structure of the present embodiment contributes to the downsizing of the shutter apparatus in the direction (the lateral size) perpendicular to the blade running direction in the following points:

the pivoting radii of the drive pins 20a, 21a effective to the downsizing of the shutter apparatus are minimized so as to become smaller than the pivoting radii of the caulking dowels (8d, 16d) for the fourth blades located at the inmost position on the first arms (in other words, the operating regions of the drive pins are positioned nearer to the rotational axis of the first arm base end than the operating regions of any other blade caulking dowels on the first arms);

in the superimposed state of the leading curtain shown in FIG. 2, the end 2b on the arm base end side in the slit forming edge 2a of the leading curtain is placed at the position where it never interferes with the drive pin 20a of the leading-curtain driving lever 20 (i.e., at the position where the drive pin 20a passes during the expanding operation of the leading curtain), and within the operating region of the drive pin 20a, thereby effectively making use of the space;

in the superimposed state of the trailing-curtain blade unit shown in FIG. 1, the end 10b on the arm base end side in the slit forming edge 10a of the trailing curtain is placed at the position where it never interferes with the drive pin 21a of the trailing-curtain driving lever 21 (i.e., at the position where the drive pin 21a passes during the expanding operation of the trailing curtain), and within the operating region of the drive pin 21a, thereby effectively making use of the space.

The following will describe the length E. In the first conventional example shown in FIGS. 21 and 22, the length E is 8.06 mm, and the parallelism of the slit forming edge at this time will be evaluated by the angle of inclination of the slit forming edge and the distance in the blade running direction (in the vertical direction in the figures) between the two ends of the slit forming edge (the straight portion).

The conditions assumed herein are that there is no fitting play at the rotational shaft portions (101d, 101e, etc.) of the arm base ends, that the fitting of the blade caulking dowels for coupling the slit forming blade to the arms is implemented under hole H 8 grade-shaft f 8 grade, and that the maximum play to the diameter φ1.5 mm is 34 μm.

Figure 10:
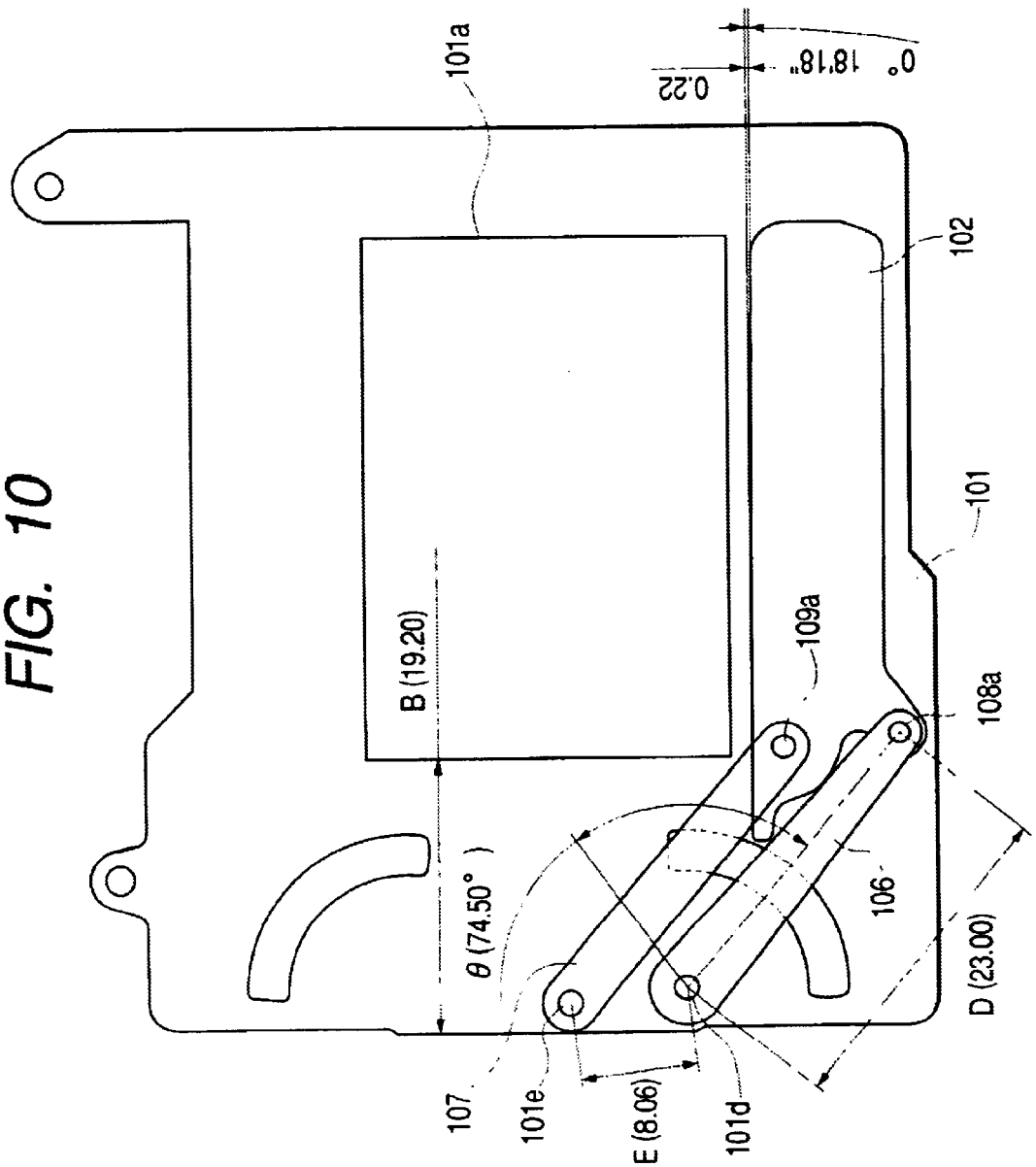
FIG. 10 is a front view of the conventional focal plane shutter (first conventional example) in the running end state, which schematically shows the balance between the arms and the slit forming blade of the leading curtain and the inclination of the slit forming edge with respect to the dimensions of the ground board.

The result is presented in FIG. 10. FIG. 10 is a view of the shutter apparatus in the running end state, schematically showing the balance between the arms and the slit forming blade of the leading curtain and the inclination of the slit forming edge with respect to the size of the shutter ground board 1. Since the same also applies similarly to the trailing curtain, the description thereof is omitted herein.

As seen from FIG. 10, the angle of inclination of the slit forming edge is 0°18'18", and the distance in the blade running direction between the two ends of the slit forming edge is 0.22 mm.

When the technology of the present invention is applied corresponding to the aforementioned length B: 17.20 mm, length D: 22.2 mm, and the lower limit of 80° for the arm maximum operating angle θ, the length E has to be 8.25 mm, as shown in FIG. 6, in order to maintain the angle of inclination of the slit forming edge and the distance in the blade running direction between the two ends of the slit forming edge at or above the same level under the same play conditions as in the above conventional example.

Figure 8:
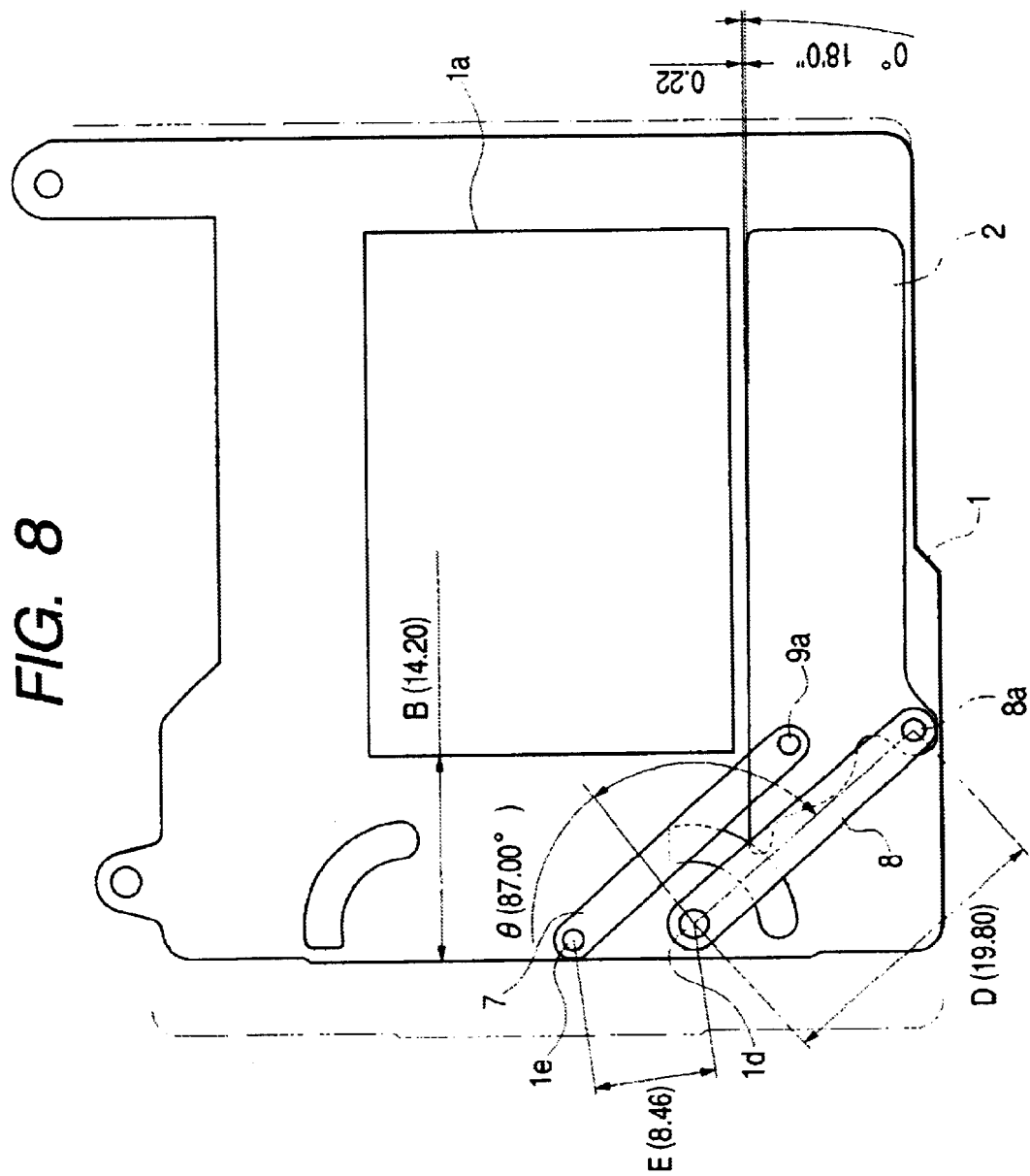
FIG. 8 is a front view of the focal plane shutter in the running end state according to the first embodiment of the present invention, which schematically shows the balance between the arms and the slit forming blade of the leading curtain and the inclination of the slit forming edge with respect to the dimensions of the ground board.

In the shutter apparatus of the first embodiment close to the optimal balance, downsized by the technology of the present invention, the length E is 8.46 mm; and under the same play conditions as in the above conventional example, as shown in FIG. 8, the angle of inclination of the slit forming edge is 0°18'0" and the distance in the blade running direction between the two ends of the slit forming edge is 0.22 mm, which are slightly better than in the conventional example.

FIG. 8 is a view of the shutter apparatus in the running end state, schematically showing the balance between the leading-curtain arms and the leading-curtain slit forming blade and the inclination of the slit forming edge with respect to the size of the shutter ground board 1 in the shutter apparatus of the first embodiment. Since the same also applies similarly to the trailing curtain, the description thereof is omitted herein.

Figure 9:
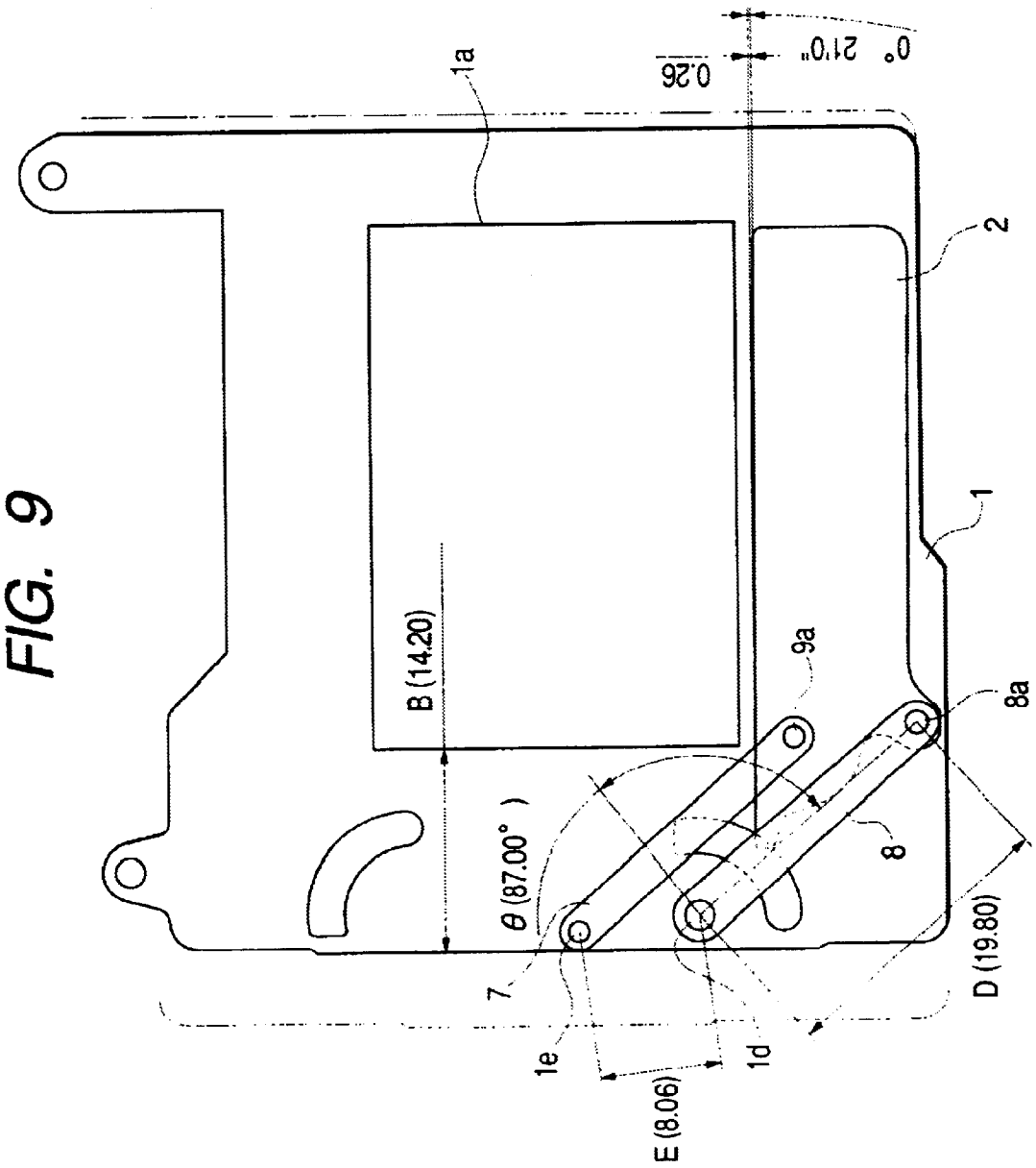
FIG. 9 is a view of the shutter in which only the size E is different from that in FIG. 8.

If in the shutter apparatus of the first embodiment the length E is kept at 8.06 mm as in the conventional example, as shown in FIG. 9 (which is a view different only in the length E from FIG. 8), the angle of inclination of the slit forming edge will be 0°21'0" and the distance in the blade running direction between the two ends of the slit forming edge will be 0.26 mm under the same play conditions as in the above conventional example, so as to degrade the parallelism of the slit forming edge, as compared with that in the conventional example. This implies degradation of exposure evenness on the exposure screen.

It is thus seen after all that the increase of the length E to 8.46 mm is appropriate in order to maintain the performance of the downsized shutter apparatus of the first embodiment at or above the level of the conventional apparatus.

For seeking for the limit of further downsizing, the technology of the present invention is applied corresponding to the aforementioned length D: 19.3 mm and the upper limit of 94° for the arm maximum operating angle θ, the material of the rotational center shafts $1d$, $1e$, $1f$, $1g$ at the arm base ends is changed from the plastic material, which permits integral molding with the shutter ground board, to metal such as stainless steel or the like, and the diameter of the shafts is decreased from φ1.6 mm to φ1.0 mm, as described previously. In conjunction therewith, the radius of the circumference of the base end of each arm in the leading curtain and in the trailing curtain is decreased by 0.3 mm. By that degree, the leading curtain and the trailing curtain of FIG. 1 can be set closer to each other by 0.3 mm each in the vertical direction.

In addition, if the vertical length of the shutter is allowed to be the same as that in the first conventional example without enlargement of the portion $1k$ adjacent to the finder eyepiece path of the camera, in the shutter ground board 1, the first arm can be moved by 0.8 mm vertically in both the leading curtain and the trailing curtain.

Therefore, by combining these, the length E becomes 9.56 mm. As shown in FIG. 7, under the same play conditions as in the foregoing conventional example, the angle of inclination of the slit forming edge is 0°16'59" and the distance in the blade running direction between the two ends of the slit forming edge is 0.21 mm, which are better than those in the conventional example.

Further increase of the length E over it will affect the finder eyepiece path of the camera and increase the vertical length of the shutter, which is not preferable.

Accordingly, the length E can be expressed by the relation as follows.

$$(8.25/24.7)A \leq E \leq (9.56/24.7)A \therefore 0.33A \leq E \leq 0.39A \quad (5)$$

The technology of the present invention permits the length E to be freely selected within the range of the length E defined by Eq (5) above.

Although the above described that it was feasible to select each of the length B from the end face on the arm base end side (on the left side on the plane of FIG. 1) in the shutter aperture $1a$ to the end face on the side where the arm base end is supported (on the left side on the plane of FIG. 1), in the shutter ground board 1, the length C from the end face on the blade distal end side (on the right side on the plane of FIG. 1) in the shutter aperture $1a$ to the end face on the blade distal end side (on the right side on the plane of FIG. 1) in the shutter ground board 1, the length D from the center of rotation of the arm base end to the center of rotation of the caulking dowel for coupling the slit forming blade at the distal end of the arm, the maximum operating angle θ of the arm around the rotational center of the arm base end, and the length E between the first and second arms of the parallel link consisting of the first arm and the second arm, alone in either of the ranges defined by Eqs (1) to (5), there are appropriate (well-balanced) combinations among the lengths and angle, as shown in FIGS. 6, 7, and 8.

The principal factors for downsizing are the length D and θ, the length E is used to control the interference of the blade coupling portions and maintain the parallelism of the slit forming blades, and the arrangement of the blade coupling portions (blade coupling dowels) on the arms is managed to control the interference of the blade coupling portions and ensure the light shielding performance, e.g., to maintain the overlapping amount between the blades. The length B and the length C are lengths derived by D, θ, and E.

In the first embodiment described above, each of the blades with the smallest travel (the fourth leading blade 5 and the fourth trailing blade 13) and the blades with the second smallest travel (the third leading blade 4 and the third trailing blade 12) out of the blades has the coupling portions to the first and second arms, the blade main body portion of the strap shape, and the light shielding piece projecting on the almost opposite side to the blade running direction from one to other of the expanded state and the superimposed state near the coupling portions (on the extension of the support portion).

For this reason, the light shielding pieces, which are inertial components of the blade units, do not have to be provided in the blades with the large travels, which can prevent the inertia of the blade units from increasing undesirably.

In addition, since each light shielding piece is shaped as an extension of the support portion, the root width of the light shielding piece can be made greater than the width on the distal end side and the light shielding piece can be thus made more resistant to bending and folding.

Since the relation of L>W is met by the width W in the running direction of the blade main body portion and the length L of the projection of the light shielding piece from the blade main body portion, the light shielding piece of the size necessary and sufficient for light shielding can be provided in each blade with the small travel, which causes the relatively small effect on the increase of inertia of the blade unit, and it is feasible to ensure the sufficient light shielding performance while suppressing the increase of inertia of the blade unit.

Further, since, in the superimposed state of the blades opening the shutter aperture, the light shielding piece of each of the blades with the third smallest travel (the second leading blade 3 and the second trailing blade 11) is located between the coupling portions to the second arm of the blade with the smallest travel and the blade with the second smallest travel, it is feasible to utilize the space on the arm base end side effectively and the foregoing arrangement contributes to the decrease in the lateral width of the shutter apparatus while securing the necessary and sufficient length and area of the light shielding piece.

In addition, the first embodiment shortens the lengths of the arms in the short arm type with the large rotational angles of the arms, controls the interference of the blade coupling portions, and also ensures the light shielding performance, e.g., maintains the overlapping amount between the blades. Further, the first embodiment increases the link interval between the arms, does not degrade the parallelism of the exposure slit, keeps the operating resistance and inertia small without complicating the structure of the blade units, downsizes the shutter in the form suitable for fast operation, and downsizes the shutter, particularly, in the direction perpendicular to the blade running direction.

If the advantage of the small inertial of the blade units is not applied to increase in the speed of the curtains while keeping the curtain speed at the same level as before, the necessary shutter charge energy will decrease and the charge mechanism will become simple and thin, thus enabling to downsize the camera. Further, it is also advantageous to increase in the frame speed during continuous shooting of the camera.

FIGS. 11 to 20 show an image display apparatus which is the second embodiment of the present invention. This image display apparatus permits the users to view images of developed film after photography in the camera, and is suitable for photostands, electronic albums, and so on.

This image display apparatus is configured to optically project a negative image onto a spatial light modulator (which will be referred to hereinafter as SLM) as a display screen, store the negative image, reverse the negative image into a positive image, and display the positive image, whereby the users can view the images of the negative film used by the general users.

More specifically, the apparatus is constructed using a ferroelectric liquid crystal (which will be referred to hereinafter as FLC) with the memory property as the liquid crystal of SLM, and is arranged to write the negative image instantaneously into the SLM by use of a strobe device used in the cameras and others and permit the users to observe the image under reading light.

Figure 11:
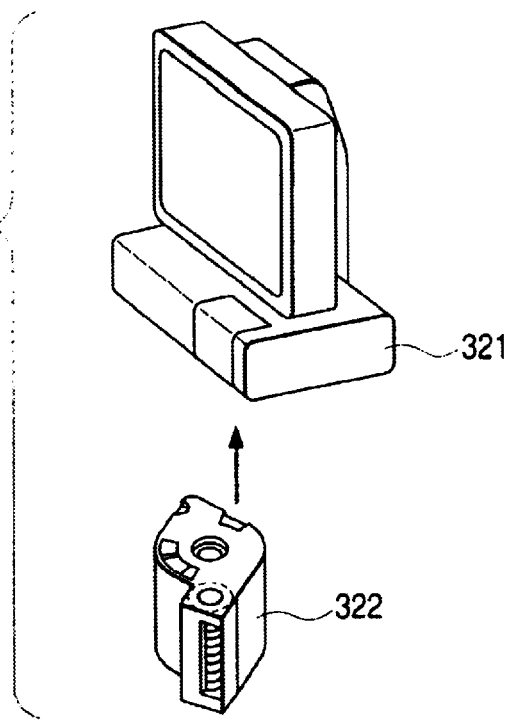
FIG. 11 is a view showing an image of image display apparatus 321 according to the second embodiment of the present invention.

FIG. 11 shows a use image of the image display apparatus 321. A developed IX240 film (hereinafter referred to as D cart 322) as the negative film is loaded into the image display apparatus 321, and a photographed image is reversed from negative to positive to be displayed as a high-definition image on the display screen.

Figure 12:
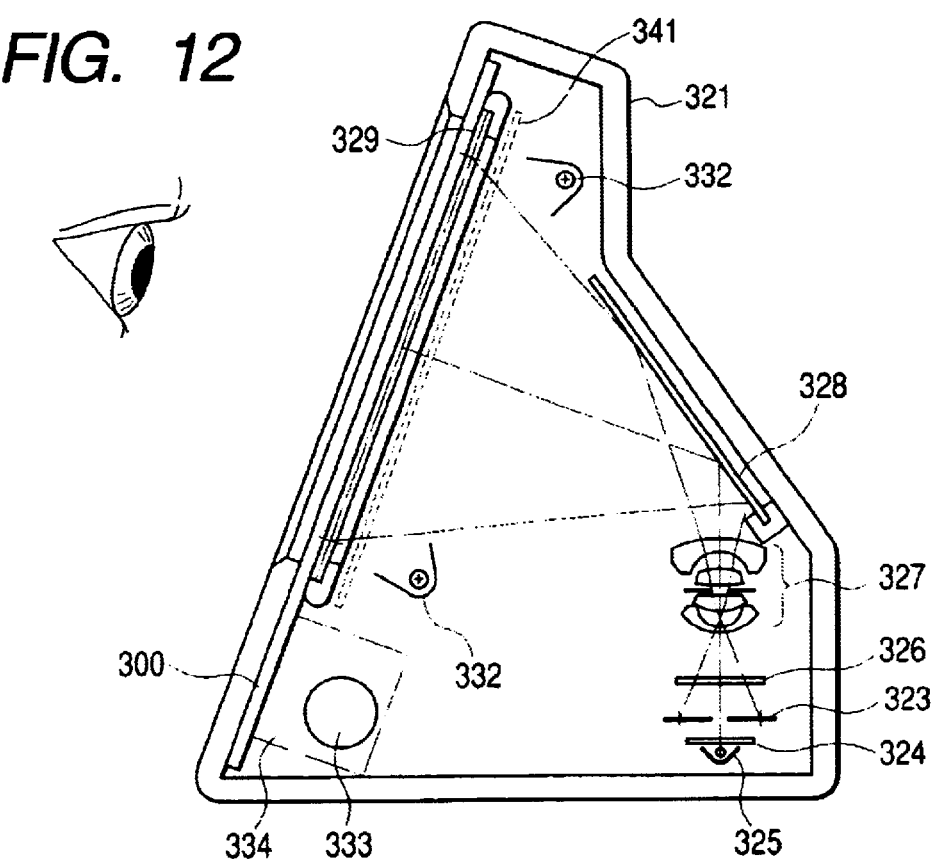
FIG. 12 is a cross-sectional view of the image display apparatus 321 according to the second embodiment of the present invention.

FIG. 12 shows the structure of the image display apparatus 321. In the same figure, numeral 323 designates the developed negative film with photographed images therein, which is drawn from the D cart 322. The apparatus is configured to index each frame of the film at the illustrated write position by an unrepresented film winding mechanism.

Numeral 324 indicates an opalescent diffuser screen, which uniformly diffuses light emitted from the strobe device 325 described hereinafter and illuminates the negative film 323.

Numeral 325 denotes the strobe device similar to that used in the cameras and others, which is composed of an Xe tube, a reflector, a light-emitting circuit, and so on. This strobe device 325 emits light in response to a trigger signal from a microprocessor (not shown).

Numeral 326 represents an orange base removing filter functioning to remove the orange base color from the negative image, which is comprised of an optical filter of blue color which is the complementary color of orange.

Numeral 327 denotes a projection lens, which projects the negative image of the negative film 323 at a predetermined magnification ratio onto a photoelectric conversion layer of SLM 329 described hereinafter, via reflecting mirror 328.

Figure 13A:
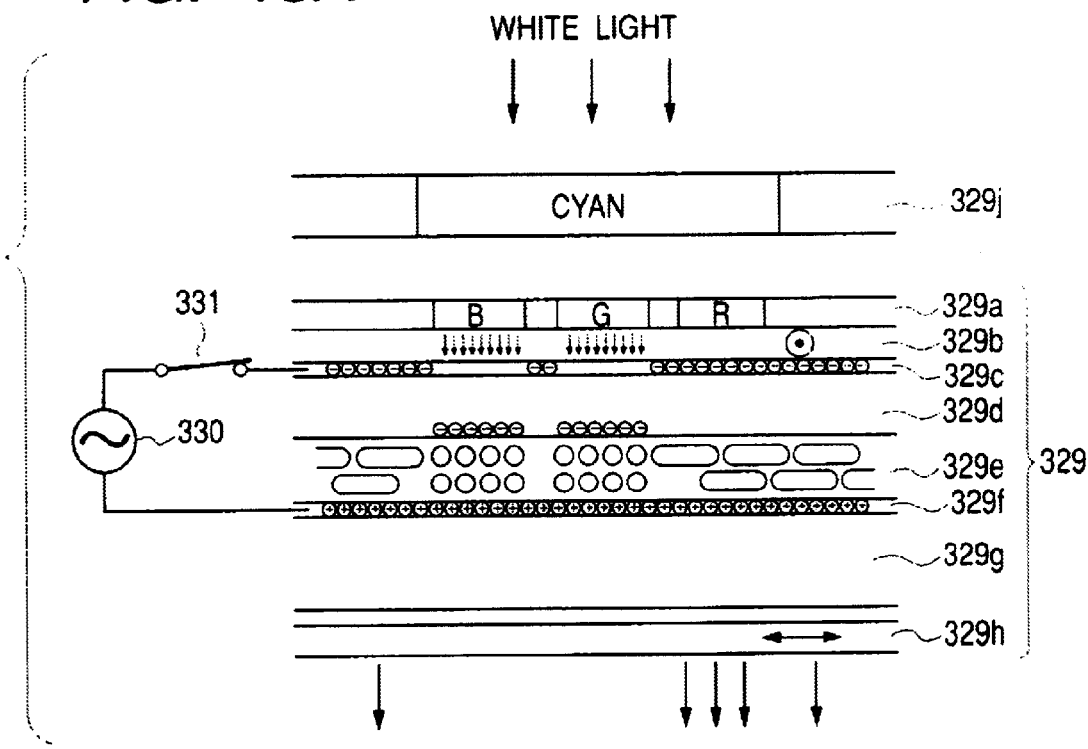

Here the SLM 329 will be described below in detail with reference to FIGS. 13A and 13B. FIG. 13A shows a state of the SLM 329 during writing of an image and FIG. 13B a state of the SLM 329 during observation of an image.

Symbol 329a is a color filter of pure colors or complimentary colors, which is desirably a fine color filter used for image pickup devices (CCDs) in video cameras and others, in the case of the present image display apparatus, because it can implement observation without degradation of the image quality of the silver-film images.

Symbols 329b and 329h denote polarizers placed on the both sides of the liquid crystal layer described hereinafter. In the structure of FIGS. 13A and 13B, the polarizer 329b has the direction of polarization along the direction normal to the plane of the figure and the polarizer 329h that along the horizontal direction on the plane of the figure. Therefore, the polarizers are arranged in the so-called crossed Nicols configuration.

Symbols 329c and 329f are transparent, electroconductive films usually made of indium oxide or the like (hereinafter referred to as ITO films). An AC power supply 330 and a circuit for driving it (not shown) are arranged to generate potentials of different polarities on the respective ITO films 329c, 329f through actuation of SW 331.

Symbol 329d denotes a photoconductive layer, which is comprised of a photodiode layer such as an amorphous film, an OPC (organic semiconductor film), or the like. One side of the photoconductive layer 329d adheres to the ITO film 329c, and the other side adheres to FLC 329e described hereinafter.

Symbol 329e denotes the FLC being a liquid crystal layer, one side of which adheres to the photoconductive layer 329d, as described above, and the other side of which adheres to the foregoing ITO film 329f.

Symbol 329g represents a glass layer, which functions to seal the liquid crystal layer and protect each of the other layers.

Symbol 329j represents a negative film image illustrated for explanation of a virtual image of pixels in the negative film 323 projected by the aforementioned projection lens 327.

In FIG. 12, numeral 332 designates a straight tube type illumination lamp often used in flat displays and others, and 300 the shutter apparatus (the shutter apparatus of the present invention) placed in front of the SLM 329.

Figure 14:
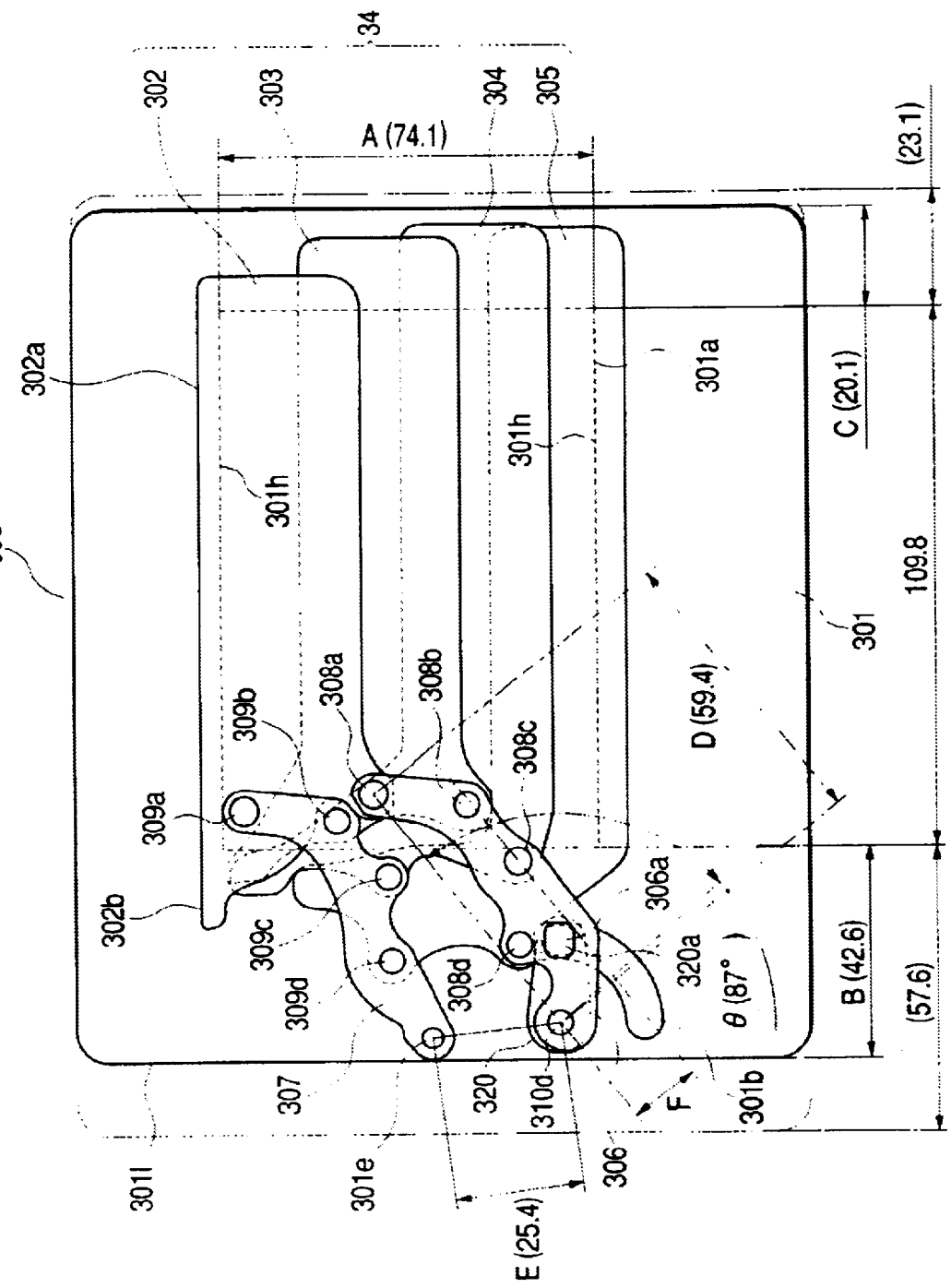
FIG. 14 is a front view showing a state in which the shutter apparatus according to the second embodiment of the present invention shields the screen of the SLM from external light.
Figure 15:
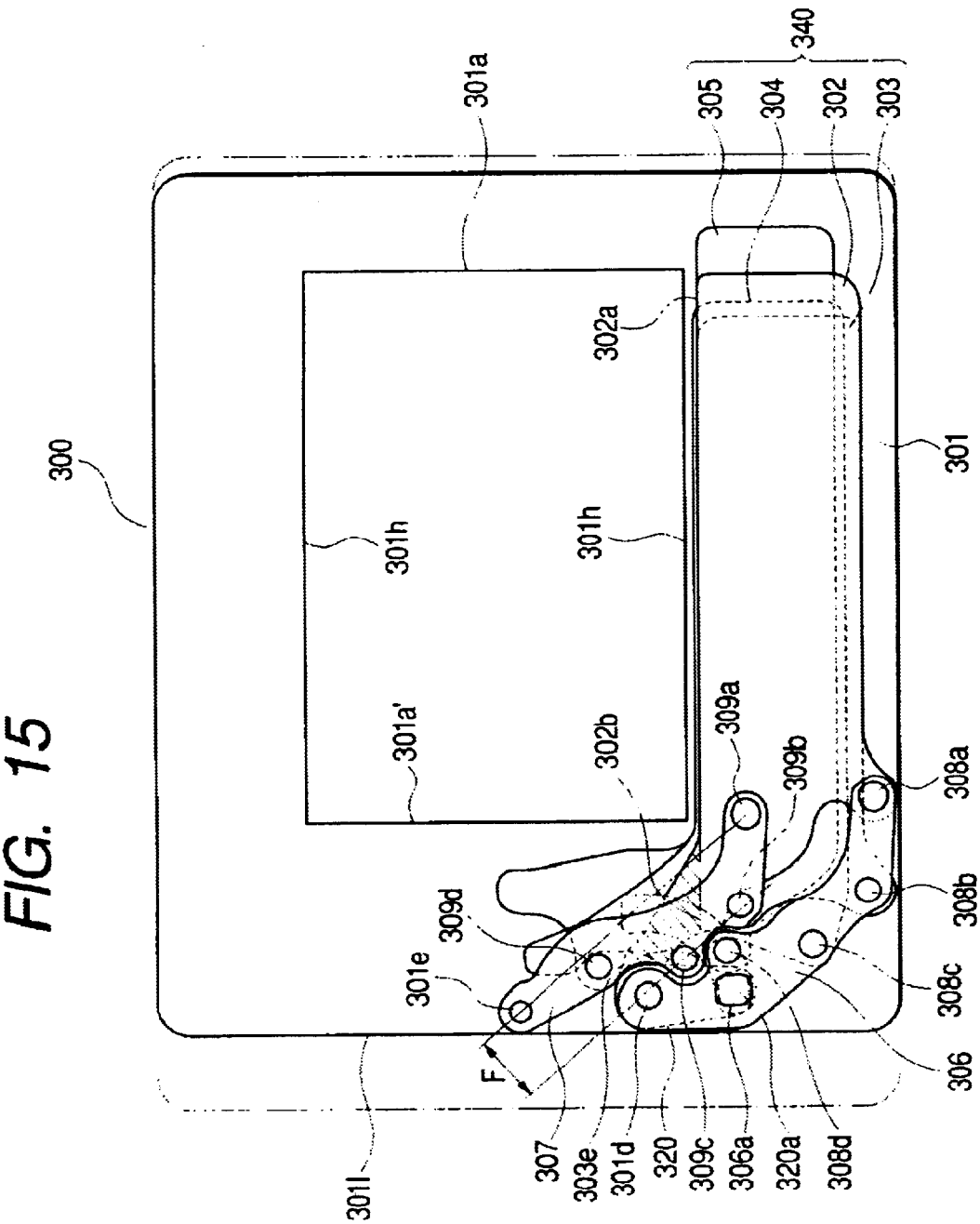
FIG. 15 is a front view showing a state in which the shutter apparatus according to the second embodiment of the present invention opens the screen of the SLM.
Figure 16:
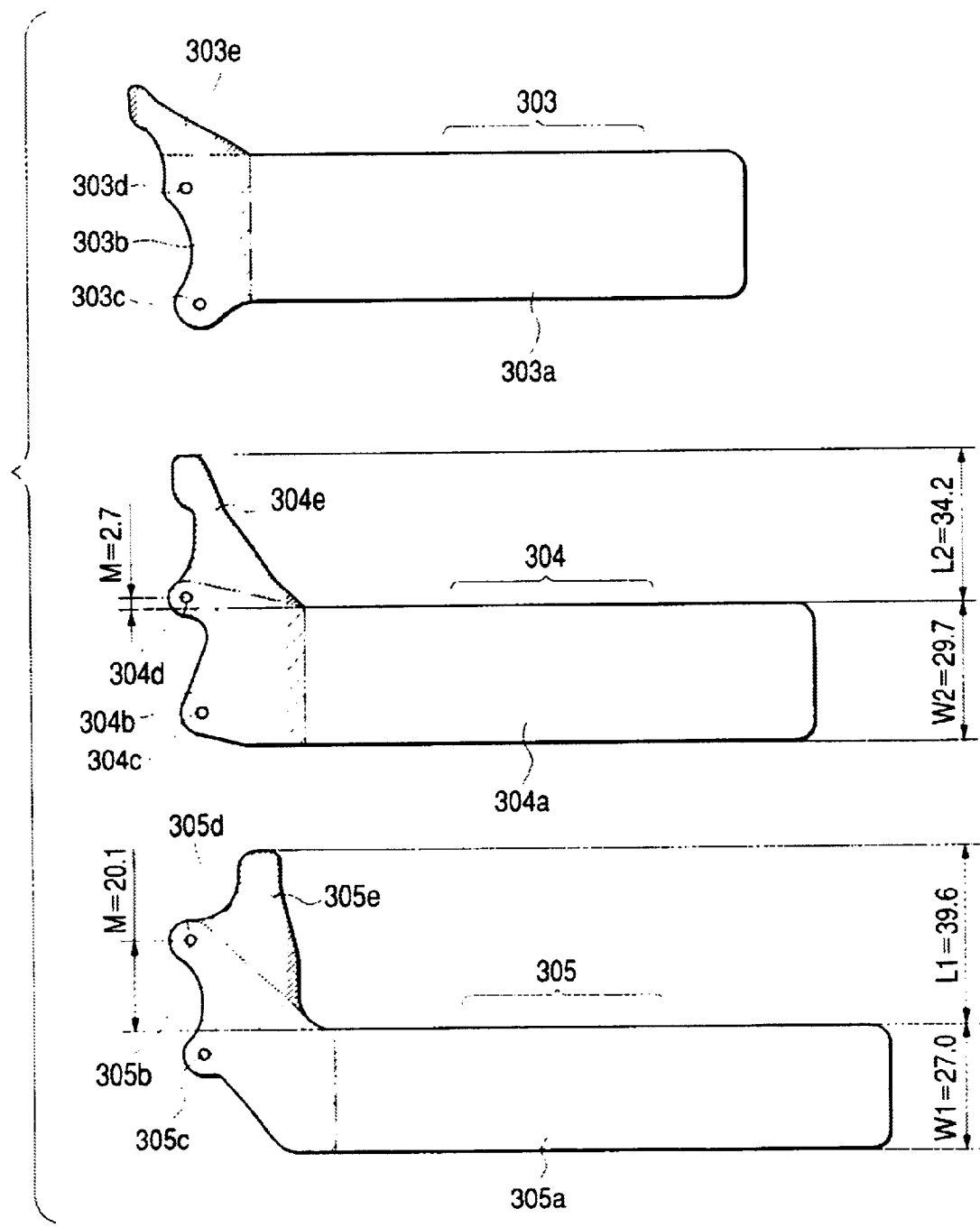
FIG. 16 is a view showing features of shapes of covering blades (the second blade, third blade, and fourth blade) according to the second embodiment of the present invention.

FIGS. 14 to 16 show the structure of the shutter apparatus 300. FIG. 14 shows a state in which the screen of the SLM 329 is shut off from the external light, and FIG. 15 a state in which the screen of the SLM 329 is opened. FIG. 16 shows the shapes of the covering blades (the second blade, the third blade, and the fourth blade).

In these figures, numeral 301 designates a base plate (hereinafter referred to as a shutter ground board) having the shutter aperture (an aperture of the apparatus for observation of image) 301a, and symbol 301b an elongated hole for defining the operating region of drive pin 320a of driving lever (a lever supplying movement energy to the blade unit) 320.

Numeral 302 denotes the first blade (slit forming blade), in which symbol 302a is a slit forming edge extending along the longitudinal direction and symbol 302b an end on the arm base end side in the slit forming edge.

Numerals 303 to 305 represent the second blade, the third blade, and the fourth blade (covering blades), respectively. Numeral 306 indicates a first arm, a base end 306b of which is mounted so as to be rotatable around a shaft 301d provided on the shutter ground board 301 and which rotatably couples with and supports the first blade 302 through a caulking dowel 308a provided on the distal end side.

Symbol 306a represents a hole through which the drive pin 320a of the driving lever 320 is made to pass without play in the driving direction. Power is transmitted from the driving lever 320 whose rotational axis is coaxial with the shaft 301d, via the hole 306a to the first arm 306.

The power generated at the motor 333 is transmitted through gear train 334 (which is displayed in a simplified form by a chain double-dashed line in FIG. 12) to the driving lever 320.

Numeral 307 designates a second arm, a base end 307b of which is mounted so as to be rotatable around a shaft 301e provided on the shutter ground board 301 and which rotatably couples with and supports the first blade 302 through a caulking dowel 309a provided on the distal end side.

In this way, a parallel link is composed of the first blade 302, the first arm 306, and the second arm 307 (and the shutter ground board 301).

Likewise, the second blade 303, the third blade 304, and the fourth blade 305 are rotatably coupled and supported through their respective caulking dowels 308b, 309b, 308c, 309c, 308d, 309d in the middle portions of the first arm 306 and the second arm 307, thereby composing the parallel link.

Among the covering blades, the second blade 303 is comprised of a blade main body portion 303a of strap shape, a support portion 303b (a dashed hatch portion) having coupling portions (holes 303c, 303d described hereinafter) to be coupled to the first and second arms 306, 307, and a light shielding piece 303e (a hatch portion) adjacent to the support portion 303b, which projects in the almost opposite direction to the blade running direction in running from the expanded state.

The hole 303c formed in the support portion 303b, and the first arm 306 are coupled by caulking at the caulking dowel 308b, and the hole 303d and the second arm 307 are coupled by caulking at the caulking dowel 309b.

The second blade 303 is a blade with the third smallest travel in running of the blades, out of the four blades.

The third blade 304 is comprised of a blade main body portion 304a of strap shape, a support portion 304b (a dashed hatch portion) having coupling portions (holes 304c, 304d described hereinafter) to be coupled to the first and second arms 306, 307, and a light shielding piece 304e (a hatch portion) adjacent to the support portion 304b, which projects in the almost opposite direction to the blade running direction in running from the expanded state.

The hole 304c formed in the support portion 304b, and the first arm 306 are coupled by caulking at the caulking dowel 308c, and the hole 304d and the second arm 307 are coupled by caulking at the caulking dowel 309c.

The third blade 304 is a blade with the second smallest travel in running of the blades, out of the four blades.

Here the light shielding pieces 303e, 304e overlap with each other to effect the light shielding on the blade unit arm side 301a' of the shutter aperture in the expanded state of the blade unit and in the middle of running from the expanded state. The hole 304d coupled to the second arm 307 is located M (=2.7 mm) outside in the running direction from a region of a lateral extension of the width W2 in the running direction (=29.7 mm) of the blade main body portion 304a.

Further, there is the relation of magnitude of L2>W2 between the length L2 (=34.2 mm) of the projection of the light shielding piece 304e from the blade main body portion 304a and the width W2 (=29.7 mm) in the running direction of the blade main body portion 304a.

The fourth blade 305 is comprised of a blade main body portion 305a of strap shape, a support portion 305b (a dashed hatch portion) having coupling portions (holes 305c, 305d described hereinafter) to be coupled to the first and second arms 306, 307, a light shielding piece 305e (a hatch portion) adjacent to the support portion 305b, which projects in the almost opposite direction to the blade running direction in running from the expanded state.

The hole 305c formed in the support portion 305b, and the first arm 306 are coupled by caulking at the caulking dowel 308d, and the hole 305d and the second arm 307 are coupled by caulking at the caulking dowel 309d.

The fourth blade 305 is a blade with the smallest travel in running of the blades, out of the four blades.

The hole 305d coupled to the second arm 307 is located M (=20.1 mm) outside in the running direction from a region of a lateral extension of the width W1 in the running direction (=27.0 mm) of the blade main body portion 305a.

There is the relation of magnitude of L1>W1 between the length L1 (=36.6 mm) of the projection of the light shielding piece 305e from the blade main body portion 305a and the width W1 (=27.0 mm) in the running direction of the blade main body portion 305a.

The distal end of the light shielding piece 303e (hatch portion) of the second blade 303 is located between the coupling portion (the portion coupled through the caulking dowel 309c) to the second arm 307 in the third blade 304 and the coupling portion (the portion coupled through the caulking dowel 309d) to the second arm 307 in the fourth blade 305 in the opening state of the screen of SLM 329 shown in FIG. 15. By this arrangement, the space between the coupling portions is effectively utilized and the length and area of the light shielding piece 303e are set to necessary and sufficient values. The light shielding blade unit 340 is constructed as described above.

In the opening state of the screen of SLM 329 shown in FIG. 15, the end 302b on the arm base end side of the slit forming edge 302a being the light shielding edge part of the slit forming blade 302 is located within the operating region of the drive pin 320a. However, since the end 302b on the arm base end side of the slit forming edge 302a moves away to the outside of the operating region of the drive pin 320a with progress of the expanding operation to close the shutter aperture, it never interferes with the drive pin 320a of the driving lever 320.

Figure 17:
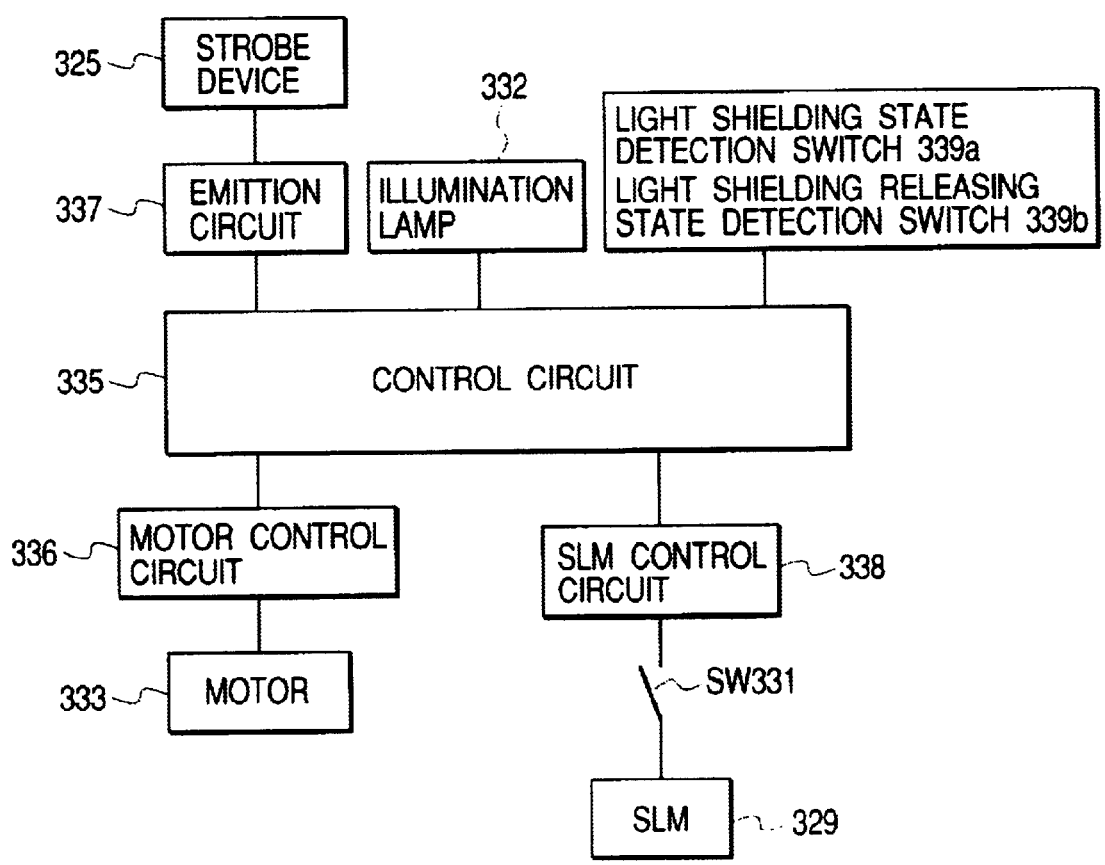
FIG. 17 is a block diagram of the image display apparatus according to the second embodiment of the present invention.

FIG. 17 shows a configuration of an electric circuit in the image display apparatus of the present embodiment. In the same figure, numeral 335 designates a control circuit which controls the overall sequence of the image display apparatus 321; 336 a motor control circuit which controls forward and backward rotation of the motor 333; 337 an emission circuit which controls light emission of the strobe device 325; and 338 an SLM control circuit which controls the SW 331 for switching ON/OFF of energization to the SLM 329.

Symbol 339a represents a light shielding state detection switch which turns on when the light shielding blade unit 340 completely shuts off the shutter aperture 301a; and 339b a light shielding releasing state detection switch which turns on when the light shielding blade unit 340 completely releases the light shielding (or opens) the shutter aperture 301a.

Numeral 341 denotes a diffusing sheet interlocked with the light shielding blade unit 340, which covers the back side of the SLM 329 and diffuses the illumination light from the illumination lamp 332 to illuminate the SLM 329 almost uniformly, from the released state of covering by the light shielding blade unit 340 on the front surface side of the SLM 329.

In the state in which the light shielding blade unit 340 covers the SLM 329 to shut off the external light, the diffusing sheet 341 moves away from the covering state over the SLM 329 into a retracted state.

Figure 18:
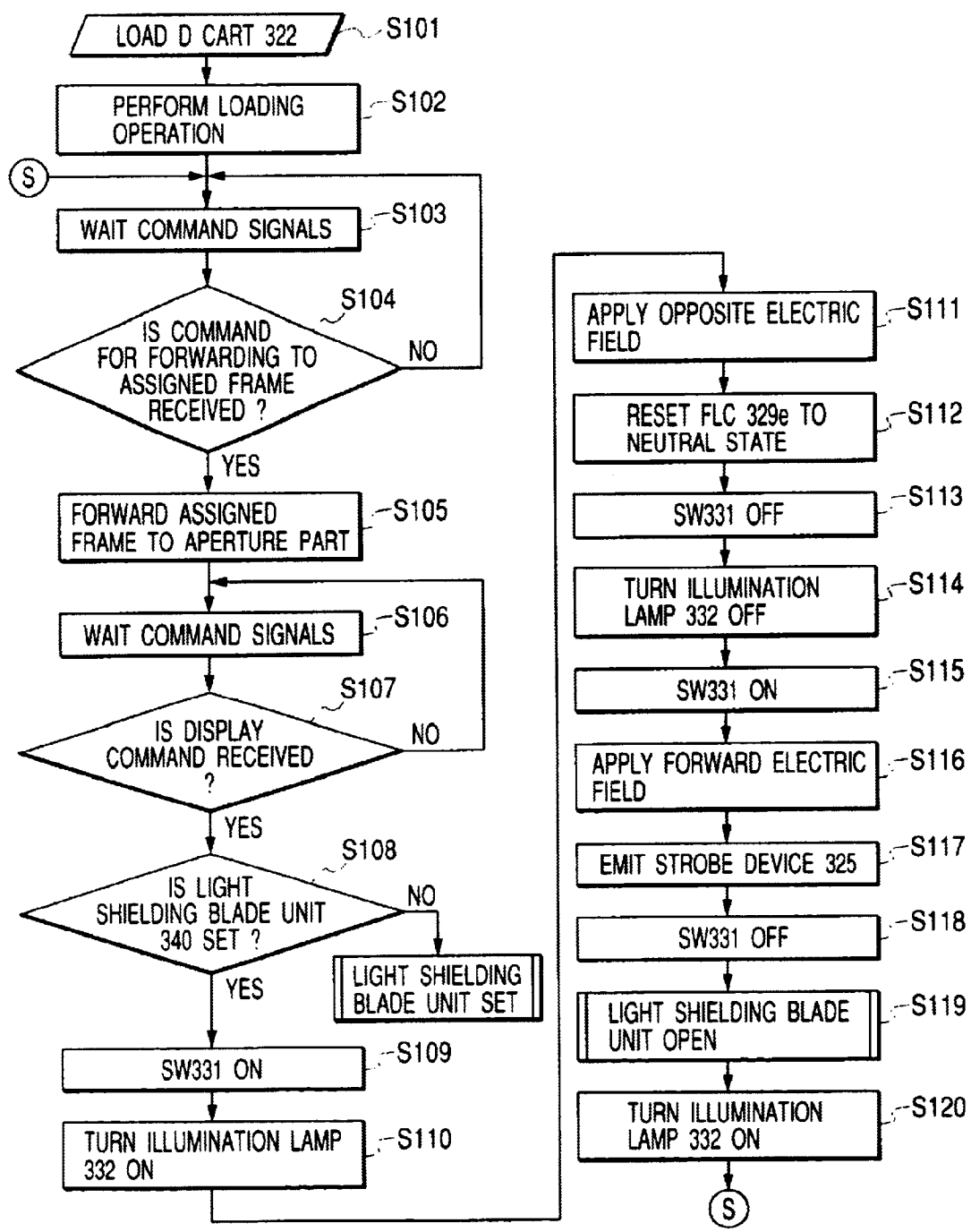
FIG. 18 is a flowchart of the image display apparatus according to the second embodiment of the present invention.

The operation of the image display apparatus 321 will be described below with reference to the flowchart of FIG. 18. This flowchart is started when the D cart 322 is loaded in the image display apparatus 321. At this time, the light shielding blade unit 340 is in the light shielding state in which the blade unit 340 covers the shutter aperture 301a of the image display apparatus 321, i.e., in a state in which the user cannot observe the image on the SLM 329.

When the D cart 322 is loaded in the image display apparatus 321 (S101), the image display apparatus 321

(control circuit 335) initiates the thrust operation of feeding the negative film 323 in the D cart 322 to position and stop the first frame of the D cart 322 at the write position (aperture portion) of the image display apparatus 321 (S102). After This, the apparatus moves into a standby mode state to await acceptance of a signal from each switch (not shown) (S103).

When receiving a signal from a remote controller, e.g., a signal to forward the screen up to a certain assigned frame (S104), the control circuit forwards the assigned frame to the aperture portion of the image display apparatus 321 (S105) and stands by in a command wait state to wait for a command of whether or not this frame to be displayed (S106).

Accepting a display command from the user in this state (S107), the control circuit 335 checks whether the light shielding state detecting switch 339a is switched from OFF to ON to bring the light shielding blade unit 340 into the light shielding state. Namely, in order to perform the operation described hereinafter (erasing of a previously displayed frame image and writing of a new image) in the state in which the light shielding blade unit 340 completely shuts off the shutter aperture 301a of the image display apparatus 321, the control circuit checks whether the light shielding blade unit 340 is set in the light shielding state (S108).

If the light shielding blade unit 340 does not shuts off the shutter aperture 301a completely herein, the control circuit proceeds to a subroutine of "light shielding blade unit set" described hereinafter.

When the light shielding state of the light shielding blade unit 340 is confirmed, in order to first erase the previously displayed frame image, SW 331 is brought into the on state (S109), the illumination lamp 332 is lit up (S110), and the light source 330 is activated to apply an opposite electric field to that during writing of image, to the SLM 329 (S111).

Figure 13B:
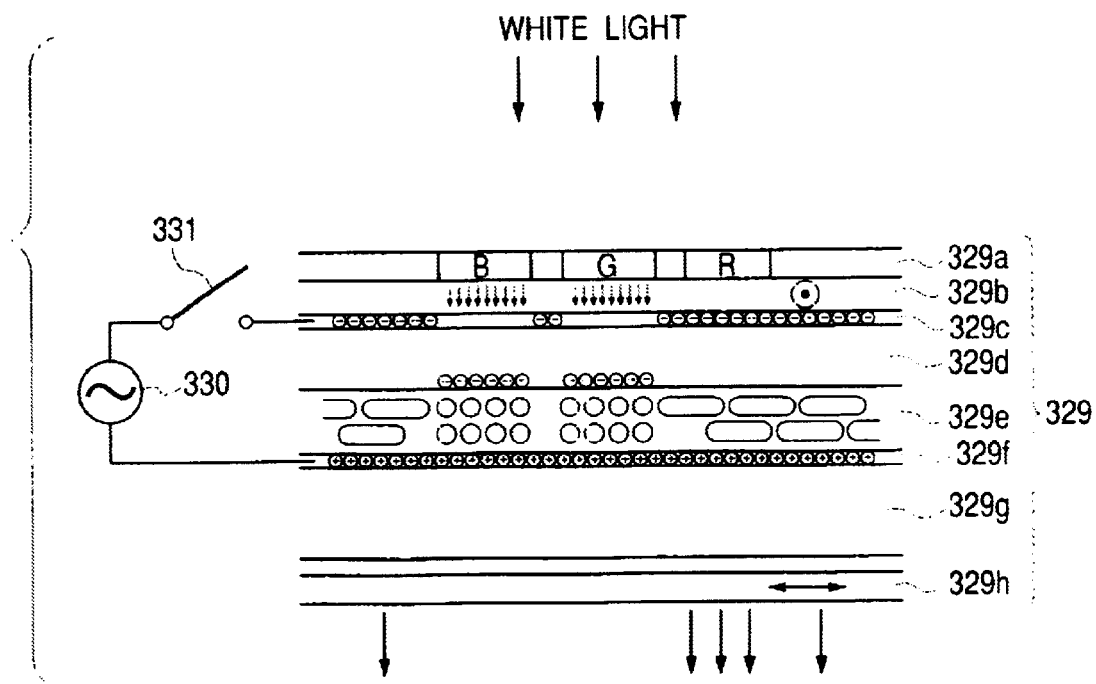

This causes the FLC 329e to be brought into a neutral state in which all the cells thereof are turned into the horizontal state shown in part in FIGS. 13A and 13B (S112). After the above reset operation is carried out for a time sufficient for all the cells to turn into the above state, SW 331 is switched off to turn the illumination lamp 332 off (S113, S114).

The operation hereinafter is the flow of the writing operation of writing the new image. The current state of the image display apparatus 321 is a state in which the image display apparatus 321 is placed, for example, on a desk at office or on a shelf of a wall or the like at home and under brightness of about several hundred lux. The external light passes through one polarizer 329h and the liquid crystal layer 329e to be reduced to about half and then enters the photoconductive layer 329d. Since SW 331 is open in the current state, no electric field is placed between the ITO films 329c, 329f. Accordingly, the FLC 329e does not react.

Here the switch SW 331 is closed to be brought into the on state (S115), and thereafter a forward electric field for writing of image is applied from the power supply 330 to the ITO films 329c, 329f (S116). Then the strobe device 325 is activated to emit light (S117) whereupon with the strobe light therefrom the image in the negative film 323 is projected onto the SLM 329 to store the image therein.

Since the strobe emission executed at step S117 is arranged to complete all the emission in the time of about 500 $\mu$sec, the on operation of SW 331 executed at step S116 is also carried out in a time approximately equivalent to the time of strobe emission. After completion of the emission, SW 331 is quickly switched off to cut off the electric field (S118).

After that, in order to permit the user to observe the image recorded in the SLM 329, the control circuit proceeds to a subroutine of "light shielding blade unit open" in which the light shielding blade unit 340 brings the shutter aperture 301a into the light shielding releasing state (S119), which will be described hereinafter. Then the illumination lamp 332 is lit up to display the image in a transmission illumination method for the user (S120).

After this, the image display apparatus 321 goes into the standby state to accept a next command (S103).

The subroutines of "light shielding blade unit set" and "light shielding blade unit open" will be described below.

Figure 19:
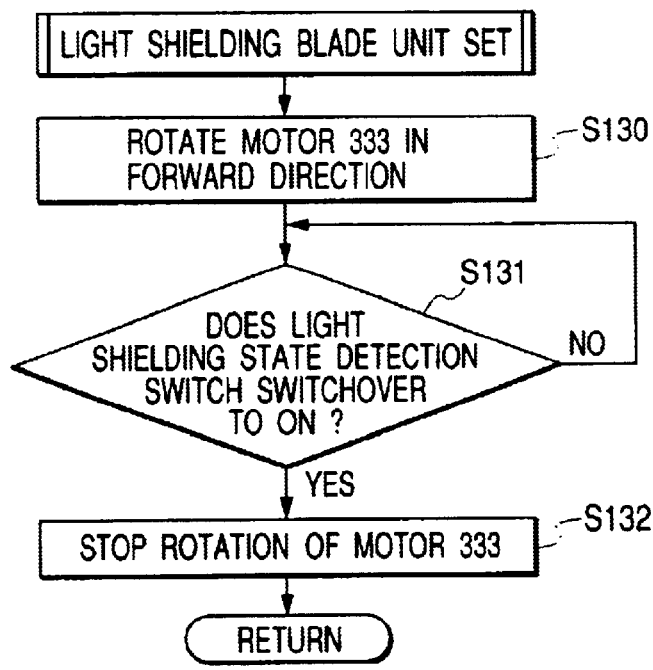
FIG. 19 is a flowchart of a subroutine of "light shielding blade unit set" of the image display apparatus according to the second embodiment of the present invention.

"Light shielding blade unit set" (cf. the flowchart of FIG. 19)

In order to effect complete light shielding of the shutter aperture 301a of the image display apparatus 321 by the light shielding blade unit 340, the motor 333 is first rotated forward (S130). This causes the blade arm 306 to be rotated counterclockwise about the shaft 301d through the gear train 334 whereby the light shielding blade unit 340 moves (or runs) from the light shielding releasing state shown in FIG. 15 to the light shielding state shown in FIG. 14.

In this operation, a surface 308c–b of a flange 308c–a of the caulking dowel for the third blade 304 always keeps its opposed state with a small clearance to the surface 301n of the shutter ground board 301, as described previously, to suppress fluttering of the light shielding blade unit 340 in the optical-axis direction during the running.

Then the diffusing sheet 341 interlocked with the light shielding blade unit 340 turns from the covering state over the SLM 329, to release the covering so as to permit writing into the SLM 329.

At almost the same timing as the complete light shielding of the shutter aperture 301a by the light shielding blade unit 340, the light shielding state detection switch 339a turns from OFF to ON.

Since in this way the control circuit 335 detects the complete light shielding of the shutter aperture 301a by the light shielding blade unit 340 (S131), the control circuit 335 outputs a signal to stop the rotation of the motor, to the motor control circuit 336, thereby stopping the rotation of the motor 333 (S132). This subroutine ends here.

Figure 20:
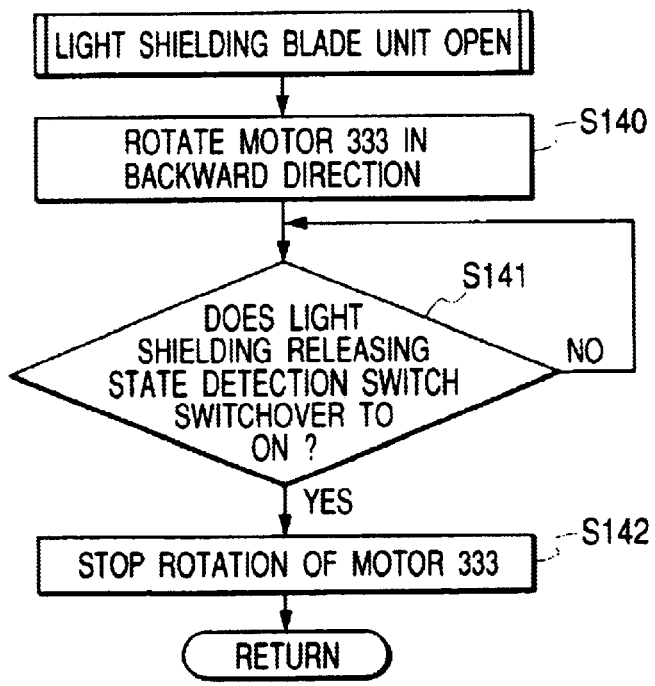
FIG. 20 is a flowchart of a subroutine of "light shielding blade unit open" of the image display apparatus according to the second embodiment of the present invention.

"Light shielding blade unit open" (cf. the flowchart of FIG. 20)

In order to release the light shielding of the shutter aperture 301a of the image display apparatus 321 completely by the light shielding blade unit 340, the motor 333 is first rotated backward (S140). This causes the blade arm 306 to rotate clockwise about the shaft 301d through the gear train 334, whereupon the light shielding blade unit 340 moves (or runs) from the light shielding state shown in FIG. 14 to the light shielding releasing state shown in FIG. 15.

In this operation, the surface 308c–b of the flange 308c–a of the caulking dowel for the third blade 304 always keeps its opposed state with the small clearance to the surface 301n of the shutter ground board 301, as described previously, to suppress the fluttering of the light shielding blade unit 340 in the optical-axis direction during the running.

Then the diffusing sheet 341 interlocked with the light shielding blade unit 340 turns from the releasing state of the covering over the SLM 329 to cover the SLM 329, whereby the light shielding blade unit 340 diffuses the illumination light from the illumination lamp 332 to illuminate the SLM 329 almost uniformly.

At almost the same timing as the time when the light shielding blade unit 340 completely releases the light shielding of the shutter aperture 301a, the light shielding releasing state detection switch 339b turns from OFF to ON.

In this way the control circuit 335 detects the complete release of light shielding of the shutter aperture 301a by the light shielding blade unit 340 (S141), and the control circuit 335 outputs a signal to stop the rotation of the motor, to the motor control circuit 336, thereby stopping the rotation of the motor 333 (S142). The subroutine ends herein.

By shutting off the external light by the light shielding blade unit 340 during the writing of image as described above, it becomes feasible to eliminate noise in the image due to the influence of external light, which occurred in the conventional image display apparatus constructed to write the image while exposing the SLM 329 to the external light.

For this reason, while the film image had to be projected with large quantity of writing light from the strobe device 325 in order to form a clear image in the apparatus heretofore, the present embodiment enables the writing of image with small quantity of light, so as to permit the downsizing of the strobe device 325, thereby permitting compactification of the image display apparatus 321.

Since Fno. of the projection lens 327 does not have to be made particularly bright, it is also feasible to design the outside diameters of lenses in the projection optical system in compact size. Further, it is also feasible to achieve great reduction of the image writing time.

The shutter apparatus in the present embodiment is mounted on the image display apparatus for observation of the SLM 329 of predetermined screen size (for example, 75 mm vertical and 111 mm horizontal); for example, the vertical length A of the shutter aperture 301a is set to 74.1 mm and the horizontal length to 109.8 mm.

Since the size of the shutter aperture 301a is determined as described above, it is necessary to decrease the size of the components around the shutter aperture 301a, in order to decrease the size of the shutter apparatus.

A method of downsizing the shutter apparatus will be described below. Here, let B be the length from the end face on the arm base end side (on the left side on the plane of FIG. 14) in the shutter aperture 301a to the end face on the side where the arm base end is supported (on the left side on the plane of FIG. 14), in the shutter ground board 301, and let C be the length from the end face on the blade distal end side (on the right side on the plane of FIG. 14) in the shutter aperture 301a to the end face on the blade distal end side (on the right side on the plane of FIG. 14) in the shutter ground board 301. Further, let D be the length from the center of rotation of the arm base end to the center of rotation of the caulking dowel coupling the first blade to the distal end of the arm, let θ be the arm maximum operating angle around the center of rotation of the base end of the arm, and let E be the length between the first and second arms of the parallel link consisting of the first arm and the second arm.

The contour of the shutter apparatus indicated by chain double-dashed lines in FIGS. 14 and 15 is one in the case of the conventional blade unit being used. Since the present embodiment uses the technology similar to the first embodiment, the lateral length of the shutter apparatus is even 18 mm smaller than before.

In the present embodiment, the rotational angles of the arms can be largely increased in the light shielding blade unit because of the arrangement in which the blade caulking dowels and others are alternately interposed, and in the blade superimposed state the lateral distance between the blade caulking dowels 308c and 308d (and between 309c and 309d) is 1.32 mm, because the caulking dowels 308c, 309c, 308d, 309d of the two blades (the third blade and the fourth blade) 304, 305 placed on the near side to the arm base end can be located near the lateral edge 3011 of the contour of the shutter ground board 301 and along the lateral edge 3011. Further, taking the maximum angle of 4° for overcharge into consideration, the lateral distance between them in the superimposed state of the blade unit can be made almost 0 (zero) mm. Accordingly, it is seen that the effect on the downsizing is considerably significant in the direction (lateral size) perpendicular to the blade running direction of the shutter.

Since the points of focus for the downsizing of the shutter apparatus [also including the arrangement of the blade support portions (blade caulking dowels) to the arms] and the specific ratios of the dimensional relations are also the same as in the first embodiment, the relations (1) to (5) derived in the first embodiment also hold in the second embodiment.

Although there are appropriate (well-balanced) combinations among the lengths as in the first embodiment, the principal factors for the downsizing are the length D and θ, the length E is used to control the interference of the blade coupling portions and maintain the parallelism of the slit forming blades, and the arrangement of the blade coupling portions to the arms is managed to control the interference of the blade coupling portions and ensure the light shielding performance, e.g., maintain the overlapping amount between the blades. The length B and the length C are lengths derived by D, θ, and E.

In the present embodiment, since each of the blade with the smallest travel (the fourth blade 305) and the blade with the second smallest travel (the third blade 304) out of the blades also has the support portion provided with the coupling portions to the first and second arms 306, 307, the blade main body portion of strap shape, and the light shielding piece projecting in the opposite direction to the running direction in running from the expanded state to the superimposed state, near the foregoing support portion (on the extension of the support portion), the light shielding portions serving as inertial components of the blade unit do not have to be provided in the blades with large travels, which can prevent the inertia of the blade unit from increasing undesirably. In addition, since each light shielding piece is shaped as an extension of the support portion, the root width of the light shielding piece can be made large, so that the light shielding piece becomes more resistant to bending and folding.

Since the relation of L>W is met between the root width W of the blade main body portion and the length L of the projection of each light shielding piece from the blade main body portion, the light shielding pieces of the sizes necessary and sufficient for the light shielding can be provided in the blades with the small travels, which cause the relatively small effect on the increase of inertia of the blade unit. By this arrangement, it is feasible to secure the sufficient light shielding performance while suppressing the increase of inertia of the blade unit.

Further, since, in the superimposed state where the blades open the shutter aperture, the light shielding piece of the blade with the third smallest travel (the second blade 303) is located between the coupling portions to the second arm 307 of the blade with the smallest travel and the blade with the second smallest travel, the space on the arm base end side can be effectively utilized, the length and area of the light shielding piece are secured at necessary and sufficient values, and the arrangement contributes to decrease in the lateral width of the shutter apparatus (the width in the direction perpendicular to the blade running direction).

In addition, the lengths of the arms are shortened in the short arm type with the large arm rotating angles, and the shutter apparatus is arranged to control the interference of the blade coupling portions and ensure the light shielding performance, e.g., maintain the overlapping amount between the blades. Further, the link interval between the arms is increased and the operating resistance and inertia are decreased, without degrading the parallelism of the blade unit and without complicating the structure of the blade unit. In this way the downsizing of the shutter apparatus is implemented in the form suitable for fast operation and the downsizing is achieved, particularly, in the direction perpendicular to the blade running direction. Since the shutter can operate at high speeds, the wait time can be shortened during rewriting of image.

If the advantage of the small inertia of the blade unit is not applied to the increase of driving speed and if the driving speed is kept at the same level as before, the necessary shutter driving energy will decrease and the driving mechanism of the motor 333, the gear train 334, etc. can be simple and thin, thus downsizing the image display apparatus.

As described above, the present invention makes it feasible to prevent the undesirable increase of inertia of the blade unit and thus facilitate the fast drive of the shutter apparatus, by providing the light shielding pieces, which can cause the increase of inertia of the blade unit, not in the light shielding blades with the large travels but in the light shielding blades with the small travels.

Since each light shielding piece has the shape in which the width thereof on the root side becomes wider in the direction nearly perpendicular to the above operating direction than on the distal end side in the projecting direction, the strength of the light shielding piece can be increased.

When the relations of L1>W1 and L2>W2 are met where L1 and L2 are the projection lengths of the respective light shielding pieces in the light shielding blade with the smallest travel and the light shielding blade with the second smallest travel and W1, W2 the widths of the respective blade main body portions in the running direction, the light shielding pieces of the sizes necessary and sufficient for the light shielding can be provided in the light shielding blades with the small travels, which cause the relatively small effect on the increase of inertia of the blade unit, whereby it becomes feasible to suppress the increase of inertia of the blade unit and ensure the sufficient light shielding performance.

Further, since the light shielding piece projecting from the blade main body portion in the almost opposite direction to the running direction from one to other out of the expanded state and the superimposed state is provided near the coupling portions to the arm members in the light shielding blade with the third smallest travel in the running of these light shielding blades and since in the superimposed state of the four light shielding blades the light shielding piece is interposed between the coupling portion to one arm member out of the two arm members in the light shielding blade with the smallest travel and the coupling portion to said one arm member in the light shielding blade with the second smallest travel, it becomes feasible to effectively utilize the space on the base end side of the arm members, secure the length and area of the light shielding piece at necessary and sufficient values, and decrease the length in the lateral direction of the shutter apparatus (in the direction perpendicular to the blade running direction).

In addition, it is feasible to decrease the lengths of the arm members to shorter values in the short arm type with the large rotating angles of the arm members, control the interference of the coupling portions, and assure the light shielding performance, e.g., maintain the overlapping amount between the blades; therefore, the shutter apparatus can be downsized, particularly, in the lateral direction in the form suitable for fast operation while keeping the operating resistance and inertia small, without complicating the structure of the blade unit.

What is claimed is:

1. A shutter apparatus comprising:

a shutter base plate having a shutter aperture;

a first arm member which rotates around a center of rotation at a first axis, relative to said shutter base plate;

a second arm member which rotates around a center of rotation at a second axis, relative to said shutter base plate; and a plurality of shutter blades, each of the plurality of shutter blades being coupled to said first and second arm members, whereby rotation of said first and second arm members around their respective axes causes said plurality of shutter blades to run over said shutter aperture, wherein each shutter blade has a blade main body portion extending in a direction perpendicular to a running direction thereof, wherein a first shutter blade with a smallest running travel comprises a light shielding portion projecting in the running direction on the coupling portion side to said first and second arm members and arranged to effect light shielding of said shutter aperture; and wherein the following condition is satisfied:

$$L1 > W1,$$

where W1 is a length, in the running direction, of the blade main body portion of said first shutter blade, and L1 is a projection length of said light shielding portion from said blade main body portion.

2. The shutter apparatus according to claim 1, wherein a second shutter blade with a second smallest running travel of said plurality of shutter blades comprises a second light shielding portion projecting in the running direction on the coupling portion side to said first and second arm members and arranged to effect light shielding of said shutter aperture.

3. The apparatus according to claim 2, wherein the following condition is satisfied:

$$L2 > W2,$$

where W2 is a length, in the running direction, of the blade main body portion of said second shutter blade, and L2 is a projection length of said second light shielding portion from said blade main body portion.

4. A camera comprising the shutter apparatus as set forth in claim 1.

5. The shutter apparatus according to claim 1, wherein the number of said shutter blades is 4.

6. A shutter apparatus comprising:

a shutter base plate having a shutter aperture;

a first arm member which rotates around a center of rotation at a first axis, relative to said shutter base plate;

a second arm member which rotates around a center of rotation at a second axis, relative to said shutter base plate; and a plurality of shutter blades, each of the plurality of shutter blades being coupled to said first and second arm members, whereby rotation of said first and second arm members rotate around their respective axes causes said plurality of shutter blades to run over said shutter aperture, wherein each shutter blade has a blade main body portion extending in a direction perpendicular to a running direction thereof, wherein a first shutter blade with a second smallest running travel comprises a light shielding portion projecting in the running direction on the coupling portion side to said first and second arm members and arranged to effect light shielding of said shutter aperture, and wherein the following condition is satisfied:

$$L2>W2,$$

where W2 is a length, in the running direction, of the blade main body portion of said first shutter blade, and L2 is a projection length of said light shielding portion from said blade main body portion.

7. The shutter apparatus according to claim 6, wherein a second shutter blade with a smallest running travel of said plurality of shutter blades comprises a second light shielding portion projecting in the running direction on the coupling portion side to said first and second arm members and arranged to effect light shielding of said shutter aperture.

8. The apparatus according to claim 7, wherein the following condition is satisfied:

$$L1>W1,$$

where W1 is a length, in the running direction, of the blade main body portion of said second shutter blade, and L1 is a projection length of said second light shielding portion from said blade main body portion.

9. A camera comprising the shutter apparatus as set forth in claim 6.

10. The shutter apparatus according to claim 6, wherein the number of said shutter blades is 4.

* * * * *